(12) United States Patent
Segev et al.

(10) Patent No.: US 10,331,913 B2
(45) Date of Patent: Jun. 25, 2019

(54) SEARCHABLE SYMMETRIC ENCRYPTION WITH ENHANCED LOCALITY VIA BALANCED ALLOCATIONS

(71) Applicants: YISSUM RESEARCH DEVELOPMENT COMPANY OF THE HEBREW UNIVERSITY OF JERUSALEM LTD., Jerusalem (IL); YEDA RESEARCH AND DEVELOPMENT CO. LTD., Rehovot (IL)

(72) Inventors: Gil Segev, Herzlyia (IL); Ido Shahaf, Jerusalem (IL); Gilad Asharov, Holon (IL); Moni Naor, Tel Aviv (IL)

(73) Assignees: Yissum Research Development Company of the Hebrew University of Jerusalem Ltd., Jerusalem (IL); Yeda Research and Development Co. Ltd., Rehovot (IL)

(\*) Notice: Subject to any disclaimer, the term of this patent is extended or adjusted under 35 U.S.C. 154(b) by 0 days.

(21) Appl. No.: 16/070,679

(22) PCT Filed: Jan. 19, 2017

(86) PCT No.: PCT/IL2017/050077
§ 371 (c)(1),
(2) Date: Jul. 17, 2018

(87) PCT Pub. No.: WO2017/125930
PCT Pub. Date: Jul. 27, 2017

(65) Prior Publication Data
US 2019/0026502 A1    Jan. 24, 2019

Related U.S. Application Data

(60) Provisional application No. 62/280,200, filed on Jan. 19, 2016.

(51) Int. Cl.
*G06F 21/00* (2013.01)
*G06F 21/79* (2013.01)
(Continued)

(52) U.S. Cl.
CPC .......... *G06F 21/79* (2013.01); *G06F 12/1408* (2013.01); *G06F 16/00* (2019.01);
(Continued)

(58) Field of Classification Search
None
See application file for complete search history.

(56) References Cited

U.S. PATENT DOCUMENTS 9,519,798 B2\* 12/2016 Egorov ............... G06F 21/6227
9,971,907 B2\* 5/2018 Egorov ............... G06F 21/6227
(Continued)

OTHER PUBLICATIONS

Demertzis, et al., "Searchable Encryption with Optimal Locality: Achieving Sublogarithmic Read Efficiency", University of Maryland, 2018, p. 1-32.\*
(Continued)

*Primary Examiner* — Jeffery L Williams
(74) *Attorney, Agent, or Firm* — The Roy Gross Law Firm, LLC; Roy Gross

(57) ABSTRACT

A method for searchable symmetric encryption. The method includes: accessing a computerized database that comprises keyword lists, each of the keyword lists comprising memory addresses of electronic documents that all contain a respective keyword; binning the memory addresses by performing balanced allocation of the memory addresses into ordered bins, such that at least some of the ordered bins each contains memory addresses of electronic documents that contain different keywords; encrypting each of the memory addresses with an encryption key that is derived from the keyword of the respective memory address; and storing the
(Continued)

ordered bins at consecutive locations in a non-transient computer-readable memory, wherein the consecutive locations preserve the order of the ordered bins.

18 Claims, 5 Drawing Sheets

(51) Int. Cl.

| | |
|---|---|
| *G06F 21/62* | (2013.01) |
| *G06F 16/00* | (2019.01) |
| *G06F 16/245* | (2019.01) |
| *G06F 12/14* | (2006.01) |
| *G06F 21/60* | (2013.01) |
| *H04L 9/08* | (2006.01) |

(52) U.S. Cl.
CPC .......... *G06F 16/245* (2019.01); *G06F 21/602* (2013.01); *G06F 21/6227* (2013.01); *H04L 9/0861* (2013.01); *G06F 2212/1052* (2013.01)

(56) References Cited

U.S. PATENT DOCUMENTS

| | | | | |
|---|---|---|---|---|
| 2005/0027678 | A1* | 2/2005 | Aono | G06F 16/328 |
| 2007/0005594 | A1* | 1/2007 | Pinkas | G06F 16/24553 |
| 2016/0330180 | A1* | 11/2016 | Egorov | G06F 21/6227 |
| 2017/0054716 | A1* | 2/2017 | Egorov | G06F 21/6227 |
| 2017/0103217 | A1* | 4/2017 | Arasu | G06F 21/606 |
| 2018/0232533 | A1* | 8/2018 | Egorov | G06F 21/6227 |
| 2019/0026502 | A1* | 1/2019 | Segev | G06F 21/79 |

OTHER PUBLICATIONS

Cash et al, "The Locality of Searchable Symmetric Encryption", DIMACSC/Columbia Data Science Institute Workshop on Cryptography for Big Data,Dec. 14, 2015, pp. 1-47.
Cash et al, "The Locality of Searchable Symmetric Encryption", International Association for Cryptologic Research, Apr. 30, 2014, pp. 1-23.
International Search Report PCT/IL2017/050077 Completed May 16, 2017; dated May 23, 2017 3 pages.
Written Opinion of the International Searching Authority PCT/IL2017/050077 dated May 23, 2017 6 pages.
Yuriy Arbitman et al: "Backyard Cuckoo Hashing: Constant Worst-Case Operations with a Succinct Representation", Proceedings of the 51st Annual IEEE Symposium on Foundations of Computer Science, pp. 787-796, Aug. 19, 2010.
Gilad Asharov et al: "Searchable Symmetric Encryption: Optimal Locality in Linear Space via Two-Dimensional Balanced Allocations", Cryptology ePrint Archive, Report 2016/251, 2016.
Yossi Azar et al: "Balanced Allocations", SIAM Journal on Computing, 29(1):180-200, 1999.
David Cash et al: "Highly-Scalable Searchable Symmetric Encryption with Support for Boolean Queries", Advances in Cryptology—CRYPTO '13, pp. 353-373, 2013.
David Cash et al: "The locality of searchable symmetric encryption", Advances in Cryptology—EUROCRYPT '14, pp. 351-368, 2014.
David Cash et al: "The Locality of Searchable Symmetric Encryption", DIMACS/ Columbia Data Science Institute Workshop on Cryptography for Big Data, Dec. 14, 2015, pp. 1-47.
Reza Curtmola et al: "Searchable Symmetric Encryption: Improved Definitions and Efficient Constructions", Proceedings of the 13th ACM Conference on Computer and Communications Security, pp. 79-88, 2006.
Martin Dietzfelbinger et al: "Succinct Data Structures for Retrieval and Approximate Membership", Proceedings of the 35th International Colloquium on Automata, Languages and Programming, pp. 385-396, 2008.
Torben Hagerup: "Sorting and Searching on the Word RAM", Proceedings of the 15th Annual Symposium on Theoretical Aspects of Computer Science, pp. 366-398, 1998.
Torben Hagerup: "Deterministic Dictionaries", Journal of Algorithms, vol. 41, No. 1, pp. 69-85, 2001.
Seny Kamara et al: "Dynamic Searchable Symmetric Encryption", Proceedings of the 19th ACM Conference on Computer and Communications Security, pp. 965-976, 2012.
Yehuda Lindell et al: "A Proof of Security of Yao's Protocol for Two-Party Computation", Journal of Cryptology, vol. 22, No. 2, pp. 161-188, 2009.
Peter Bro Miltersen: "Cell probe complexity—a survey", Proceedings of the 19th Conference on the Foundations of Software Technology and Theoretical Computer Science, Advances in Data Structures Workshop, 1999.
Michael Mitzenmacher et al: "The Power of Two Random Choices: A Survey of Techniques and Results", Handbook of Randomized Computing, pp. 255-312, 2000.
Michael Mitzenmacher et al: "Probability and Computing—Randomized Algorithms and Probabilistic Analysis", Cambridge University Press, 2005.
Rasmus Pagh: "Cuckoo Hashing", Journal of Algorithms, vol. 51, No. 2, pp. 122-144, 2004.
Anna Pagh et al: "Uniform Hashing in Constant Time and Pptimal Space", SIAM Journal on Computing, vol. 38, No. 1, pp. 85-96, 2008.
Dawn Xiaodong Song et al: "Practical Techniques for Searches on Encrypted Data", Proceedings of the 21st Annual IEEE Symposium on Security and Privacy, pp. 44-55, 2000.

\* cited by examiner

SEARCHABLE SYMMETRIC ENCRYPTION WITH ENHANCED LOCALITY VIA BALANCED ALLOCATIONS

RELATED APPLICATIONS

This application is a National Phase of PCT Patent Application No. PCT/IL2017/050077 having International filing date of Jan. 19, 2017, which claims the benefit of priority of U.S. Patent Application No. 62/280,200 filed on Jan. 19, 2016. The contents of the above applications are all incorporated by reference as if fully set forth herein in their entirety.

BACKGROUND

The invention relates to the field of computerized encrypted storage.

Outsourcing data storage to remote servers is an extremely useful technology that has been adopted both by large organizations and by individual users. It offers great benefits, but at the same time, raises various concerns when dealing with sensitive data. In particular, in order to preserve the confidentially of the data against an untrusted server, user-side symmetric encryption methods are typically employed prior to storing the data. As a result, operations as basic as keyword searches become computationally-expensive and sometimes even infeasible. This problem has motivated the cryptographic community to develop encryption methods that enable to search over symmetrically-encrypted data while not revealing sensitive information.

Searchable symmetric encryption (SSE) is a mechanism that allows a client to store data on an untrusted server and later perform keyword searches. See, for example, D. X. Song, D. Wagner, and A. Perrig. Practical techniques for searches on encrypted data. In *Proceedings of the 21st Annual IEEE Symposium on Security and Privacy*, pages 44-55, 2000. In SSE, given a keyword w, the client should be able to retrieve all documents that contain w. First, the client encrypts its database and uploads it to the server. The client can then repeatedly query the server with various keywords. Informally, the security requirement asks that the server does not learn any information about keywords for which the client did not issue any queries.

A very productive line of research has been devoted to the construction of searchable symmetric encryption schemes. However, implementations and experiments with real-world databases oftentimes indicate that the performance of the known schemes is quite disappointing and scales badly to large databases. See, for example, D. Cash, S. Jarecki, C. S. Jutla, H. Krawczyk, M. Rosu, and M. Steiner. Highly-scalable searchable symmetric encryption with support for boolean queries. In *Advances in Cryptology—CRYPTO '13*, pages 353-373, 2013. Somewhat surprisingly, it turns out that the main bottleneck is in fact not the cryptographic processing of the data, but rather lower-level issues resulting from the inefficient memory layouts required by these schemes.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment pertains to a method for searchable symmetric encryption, the method comprising using at least one hardware processor for: accessing a computerized database that comprises keyword lists, each of the keyword lists comprising memory addresses of electronic documents that all contain a respective keyword; binning the memory addresses by performing balanced allocation of the memory addresses into ordered bins, such that at least some of the ordered bins each contains memory addresses of electronic documents that contain different keywords; encrypting each of the memory addresses with an encryption key that is derived from the keyword of the respective memory address; and storing the ordered bins at consecutive locations in a non-transient computer-readable memory, wherein the consecutive locations preserve the order of the ordered bins.

Another embodiment pertains to a computer program product for searchable symmetric encryption, the computer program product comprising a non-transitory computer-readable storage medium having program code embodied therewith, the program code executable by at least one hardware processor to: access a computerized database that comprises keyword lists, each of the keyword lists comprising memory addresses of electronic documents that all contain a respective keyword; bin the memory addresses by performing balanced allocation of the memory addresses into ordered bins, such that at least some of the ordered bins each contains memory addresses of electronic documents that contain different keywords; encrypt each of the memory addresses with an encryption key that is derived from the keyword of the respective memory address; and store the ordered bins at consecutive locations in a non-transient computer-readable memory, wherein the consecutive locations preserve the order of the ordered bins.

A further embodiment relates to a system comprising: at least one hardware processor; and a non-transitory computer-readable storage medium having program code embodied therewith, the program code executable by said at least one hardware processor to: access a computerized database that comprises keyword lists, each of the keyword lists comprising memory addresses of electronic documents that all contain a respective keyword; bin the memory addresses by performing balanced allocation of the memory addresses into ordered bins, such that at least some of the ordered bins each contains memory addresses of electronic documents that contain different keywords; encrypt each of the memory addresses with an encryption key that is derived from the keyword of the respective memory address; and store the ordered bins at consecutive locations in a non-transient computer-readable memory, wherein the consecutive locations preserve the order of the ordered bins.

An additional embodiment pertains to a method for searchable symmetric encryption, the method comprising using at least one hardware processor for: accessing a computerized database that comprises keyword lists, each of the keyword lists comprising electronic documents that all contain a respective keyword; binning the electronic documents by performing balanced allocation of the electronic documents into ordered bins, such that at least some of the ordered bins each contains electronic documents that contain different keywords; and storing the ordered bins at consecutive locations in a non-transient computer-readable memory, wherein the consecutive locations preserve the order of the ordered bins.

Another embodiment pertains to a computer program product for searchable symmetric encryption, the computer program product comprising a non-transitory computer-readable storage medium having program code embodied therewith, the program code executable by at least one hardware processor to: access a computerized database that comprises keyword lists, each of the keyword lists comprising electronic documents that all contain a respective keyword; bin the electronic documents by performing balanced allocation of the electronic documents into ordered bins, such that at least some of the ordered bins each contains electronic documents that contain different keywords; encrypt each of the electronic documents with an encryption key that is derived from the keyword of the respective electronic document; and store the ordered bins at consecutive locations in a non-transient computer-readable memory, wherein the consecutive locations preserve the order of the ordered bins.

A further embodiment relates to a system comprising: at least one hardware processor; and a non-transitory computer-readable storage medium having program code embodied therewith, the program code executable by said at least one hardware processor to: access a computerized database that comprises keyword lists, each of the keyword lists comprising electronic documents that all contain a respective keyword; bin the electronic documents by performing balanced allocation of the electronic documents into ordered bins, such that at least some of the ordered bins each contains electronic documents that contain different keywords; encrypt each of the electronic documents with an encryption key that is derived from the keyword of the respective electronic document; and store the ordered bins at consecutive locations in a non-transient computer-readable memory, wherein the consecutive locations preserve the order of the ordered bins.

In some embodiments, the balanced allocation comprises: distributing the memory addresses of each keyword list along consecutive ones of the ordered bins.

In some embodiments, the balanced allocation comprises: distributing the electronic documents of each keyword list along consecutive ones of the ordered bins.

In some embodiments, the method further comprises, following said binning: padding at least some of the ordered bins such that all the ordered bins are of a same size.

In some embodiments, the method further comprises, following said padding: uniformly shuffling each of the padded ordered bins.

In some embodiments, the method further comprises recovering a requested one of the keyword lists by: receiving a query, the query comprising a decryption key that corresponds to the encryption key that was derived from the respective keyword of the requested keyword list, attempting to decrypt encrypted memory addresses in consecutively-located bins, until reaching one of the bins in which none of the encrypted memory addresses is decryptable; and utilizing those of the memory addresses that were successfully decrypted to access the electronic documents stored at those memory addresses.

In some embodiments, the method further comprises recovering a requested one of the keyword lists by: receiving a query, the query comprising a decryption key that corresponds to the encryption key that was derived from the respective keyword of the requested keyword list, attempting to decrypt encrypted electronic documents in consecutively-located bins, until reaching one of the bins in which none of the encrypted electronic documents is decryptable; and accessing the decrypted electronic documents.

In some embodiments, the program code is further executable, following said padding, to: uniformly shuffling each of the padded ordered bins.

In some embodiments, the program code is further executable to: recover a requested one of the keyword lists by: receiving a query, the query comprising a decryption key that corresponds to the encryption key that is derived from the respective keyword of the requested keyword list, attempting to decrypt encrypted memory addresses in consecutively-located bins, until reaching one of the bins in which none of the encrypted memory addresses is decryptable; and utilize those of the memory addresses that were successfully decrypted to access the electronic documents stored at those memory addresses.

In some embodiments, the program code is further executable to: recover a requested one of the keyword lists by: receiving a query, the query comprising a decryption key that corresponds to the encryption key that was derived from the respective keyword of the requested keyword list, attempting to decrypt encrypted electronic documents in consecutively-located bins, until reaching one of the bins in which none of the encrypted electronic documents is decryptable; and utilize those of the memory addresses that were successfully decrypted to access the electronic documents stored at those memory addresses.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
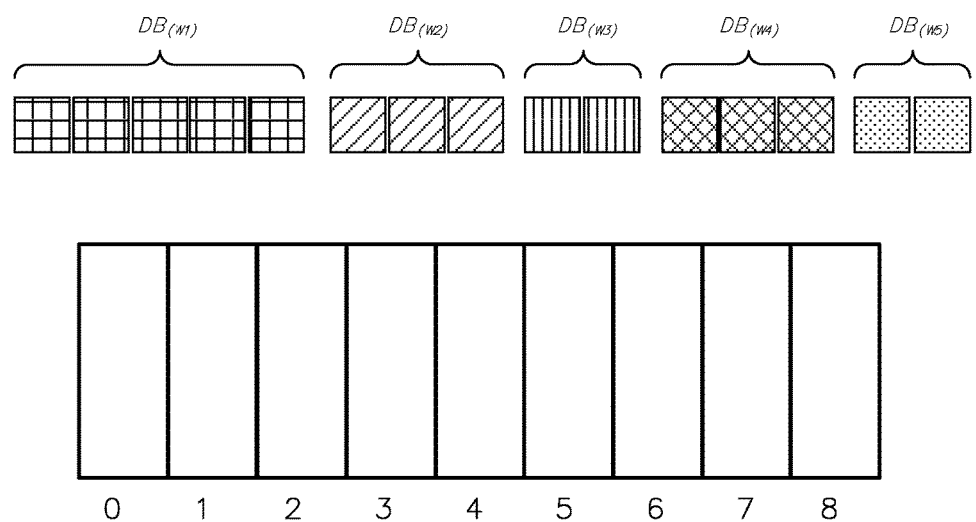
FIG. 1A shows an initial state in which bins are empty, in accordance with some embodiments.

Disclosed herein is an SSE scheme that simultaneously enjoys asymptotically optimal locality, asymptotically optimal space overhead, and asymptotically nearly-optimal read efficiency.

Specifically, for a database of size N, under the modest assumption that no keyword appears in more than $N^{1-1/\log \log N}$ documents, the present SSE scheme enjoys a read efficiency of $\tilde{O}(\log N)$ or, in some embodiments, even $\tilde{O}(\log \log N)$ or better. This essentially matches the lower bound of Cash and Tessaro (D. Cash and S. Tessaro. The locality of searchable symmetric encryption. In *Advances in Cryptology—EUROCRYPT* '14, pages 351-368, 2014), showing that any SSE scheme must be sub-optimal in either its locality, its space overhead, or its read efficiency.

The present SSE scheme is obtained via a two-dimensional generalization of the classic balanced allocations ("balls and bins") problem, which results in an asymptotically nearly-optimal two-dimensional balanced allocation scheme.

Advantageously, the present SSE scheme overcomes the major drawback in many of today's SSE schemes—poor locality. Here, the server does not have to access a rather large number of non-contiguous memory locations with each query.

This disclosure denotes that a database is represented as a collection DB={DB($w_1$), . . . , DB($w_{n_w}$)}, where $w_1, \ldots, w_{n_w}$ are distinct keywords, and DB(w) is the list of all identifiers of electronic documents that contain the keyword w. The identifiers are optionally memory addresses of the documents, namely—pointers to where these documents are stored. These may be memory addresses in a specific non-transient computer-readable storage medium or media, which are accessible via a local computer bus and/or a network (i.e. via a uniform resource locator (URL), an Internet Protocol (IP) address, or the like). Namely, the collection DB may be an index, as this term is defined in the field of computerized search, of multiple electronic documents that are stored on a non-transient computer-readable storage medium or media.

Even though the present disclosure relates to DB(w) as a list document identifiers, it is explicitly intended herein that, instead of DB(w) being the list of all identifiers of electronic documents that contain the keyword w, DB(w) may also be a storage of those electronic documents themselves. The former alternative is the one discussed throughout this disclosure, for reasons of simplicity.

$N=\Sigma_{i=1}^{n_w} |DB(w_i)|$ denotes the size of the database, and, for each keyword w, $n_w=|DB(w)|$ denotes the number of documents containing w. The standard unit-cost word-RAM (Random Access Machine) model is used here for convenience, since it is considered by many to be the standard model for analyzing the efficiency of data structures. See, for example: M. Dietzfelbinger and R. Pagh. Succinct data structures for retrieval and approximate membership. In *Proceedings of the 35th International Colloquium on Automata, Languages and Programming*, pages 385-396, 2008; T. Hagerup. Sorting and searching on the word RAM. In *Proceedings of the 15th Annual Symposium on Theoretical Aspects of Computer Science*, pages 366-398, 1998; T. Hagerup, P. B. Miltersen, and R. Pagh. Deterministic dictionaries. *Journal of Algorithms*, 41(1): 69-85, 2001; P. B. Miltersen. Cell probe complexity—a survey. In *Proceedings of the 19th Conference on the Foundations of Software Technology and Theoretical Computer Science, Advances in Data Structures Workshop*, 1999; and A. Pagh and R. Pagh. Uniform hashing in constant time and optimal space. *SIAM Journal on Computing*, 38(1):85-96, 2008.

It is also assumed, for simplicity, that keywords and document identifiers are represented using a constant number of machine words (thus space usage is measured in machine words).

Disclosed herein are two searchable symmetric encryption schemes whose efficiency guarantees are summarized in Theorem 1.1 and in Table 1 below. The first scheme, referred to as a "one-choice" scheme, includes balanced allocation of encrypted document identifiers directly into designated bins. In the second scheme, denoted a "multiple-choice" scheme, the balanced allocation of the encrypted document identifiers is starts, in each iteration, at a certain bin selected from multiple possible bins. Whereas the one-choice scheme provides a read efficiency of $\tilde{O}(\log N)$ the multiple-choice scheme may provide a read efficiency of $\tilde{O}(\log \log N)$ when selecting a bin from two possible bins, and an even better read efficiency when selecting from more than two bins.

Throughout this disclosure, for any function $f(n)$, $\tilde{O}(f(n))$ denotes $O(f(n)(\log f(n))^c)$ for some constant c.

Theorem 1.1:

Assuming the existence of one-way functions, there exist searchable symmetric encryption schemes offering the following guarantees for databases of size N:

1. Space O(N), locality O(1), and read efficiency $\tilde{O}(\log N)$ without any assumptions on the structure of the database.

2. Space O(N), locality O(1), and read efficiency $\tilde{O}(\log \log N)$ assuming that no keyword appears in more than $$N^{1-\frac{1}{\log \log N}}$$

documents.

Table 1 compares the efficiency guarantees of the present schemes to those of some previously known schemes that have less than a polynomial space overhead. Recall that N denotes the size of the underlying database, and $n_w$ denotes the number of documents that contain each keyword w (note that $n_w$ may be as large as N). The present second scheme is based on the modest assumption that no keyword appears in more than $N^{1-1/\log \log N}$ documents.

Compared to those previously known schemes, the present first and second schemes show that asymptotically optimal space and locality can be achieved together with an asymptotically nearly-optimal read efficiency.

TABLE 1

| Scheme | Space | Locality | Read Efficiency |
|---|---|---|---|
| Curtmola 2006; Kamara 2012; Cash 2013 | O(N) | O($n_w$) | O(1) |
| Cash and Tessaro 2014 | O(NlogN) | O(logN) | O(1) |
| The present one-choice scheme | O(N) | O(1) | $\tilde{O}$(logN) |
| The present two-choice scheme | O(N) | O(1) | $\tilde{O}$(loglogN) |
| Lower bound per Cash 2014 | ω(N) | O(1) | O(1) |

In the table: Curtmola 2006 refers to R. Curtmola, J. A. Garay, S. Kamara, and R. Ostrovsky. Searchable symmetric encryption: improved definitions and efficient constructions. In *Proceedings of the 13th ACM Conference on Computer and Communications Security*, pages 79-88, 2006; Kamara 2012 refers to S. Kamara, C. Papamanthou, and T. Roeder. Dynamic searchable symmetric encryption. In *Proceedings of the 19th ACM Conference on Computer and Communications Security*, pages 965-976, 2012; Cash 2013 refers to D. Cash, S. Jarecki, C. S. Jutla, H. Krawczyk, M. Rosu, and M. Steiner. Highly-scalable searchable symmetric encryption with support for boolean queries. In *Advances in Cryptology—CRYPTO* '13, pages 353-373, 2013; and Cash 2014 refers to D. Cash and S. Tessaro. The locality of searchable symmetric encryption. In *Advances in Cryptology—EUROCRYPT '14*, pages 351-368, 2014.

Given a database $DB=\{DB(w_1), \ldots, DB(w_{n_w})\}$, one of the previously known approaches completely ignores the structure of the lists, and places each document identifier in a random location (leading to locality $n_w=|DB(w)|$). Another one of the previously known approaches preserves the structure of the lists and places the document identifiers of each list in consecutive locations (leading to optimal locality and read efficiency, but with an impractical space overhead). The present disclosure, in contrast, preserves the structure of the lists, but does not place document identifiers from the same list in consecutive locations. Instead, document identifiers from the same list are placed sufficiently near each other, yet in a random manner allowing document identifiers from other lists to be placed between them. Advantageously, this flexibility enables constant locality in linear space, while only slightly affecting the read efficiency.

The following discussions begin by describing the one-choice scheme, and follow with a description of the more efficient two-choice scheme (which can be generalized to any multiple-choice scheme).

The One-choice Scheme:

A computerized database $DB=\{DB(w_1), \ldots, DB(w_{n_w})\}$ of size N is provided and accessed. Each of the keyword lists $DB(w_1), \ldots, DB(w_{n_w})$ contains document identifiers (such as memory addresses) of electronic documents that all contain the respective keyword $w_1, \ldots, w_{n_w}$.

Then, a binning process commences, to construct an encrypted database as follows: For each keyword w, a hash value h(w) is computed, and a balanced allocation is performed by allocating the $i^{th}$ document identifier from the list DB(w) to the bin h(w)+i−1. That is, the identifier of the first document containing w is placed in the bin h(w), the identifier of the second document containing w is placed in the bin h(w)+1, and so on.

Once this process is completed for all keywords, each bin may contain more than a single document. Specifically, at least some of the bins may each contain multiple documents corresponding to different keywords. This can naturally be viewed as a two-dimensional generalization of the classic "balls and bins" problem, where one dimension consists of the keywords and the additional dimension consists of the structure of their lists (i.e., the lengths of their lists).

FIGS. 1A-1G illustrate this process. Each of these figures shows nine exemplary ordered bins (numbered 0 through 8) each having a size of 3 (namely, it can store up to 3 document identifiers), and document identifiers that are taken from a database of five respective keyword lists $(DB(w_1), \ldots, DB(w_5)$ and allocated to the bins. The number of bins, document identifiers, and keyword lists in these figures, as well as the size of the bins, is intended merely as a simplistic example.

FIG. 1A shows an initial state in which the bins are empty.

Figure 1B:
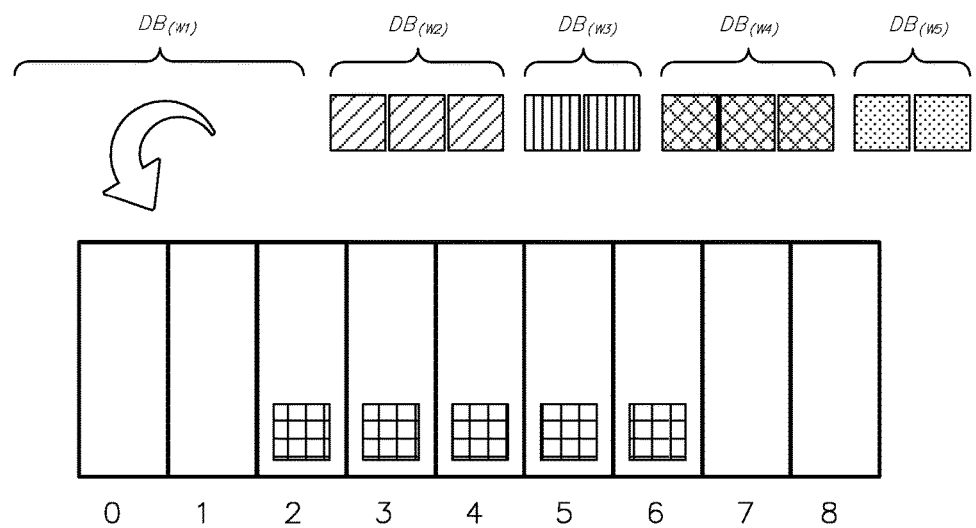
FIG. 1B shows the state of the bins after document identifiers of a first keyword list have been allocated, in accordance with some embodiments.

FIG. 1B shows the state of the bins after the five document identifiers of $DB(w_1)$ have been allocated to bins 2 through 6.

Figure 1C:
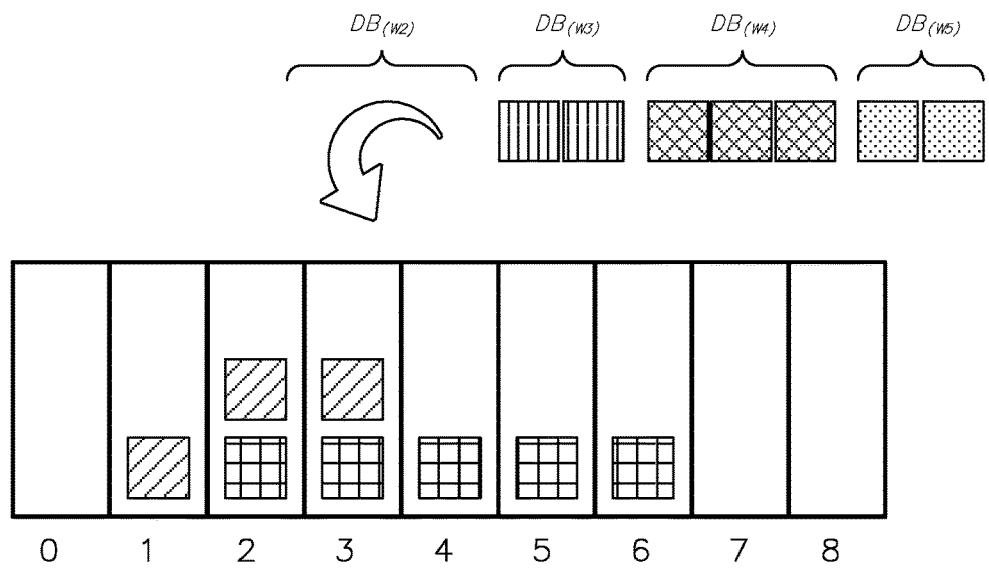
FIG. 1C shows the state of the bins after document identifiers of a second keyword list have been allocated, in accordance with some embodiments.

FIG. 1C shows the state of the bins after the three document identifiers of $DB(w_2)$ have been allocated to bins 1 through 3.

Figure 1D:
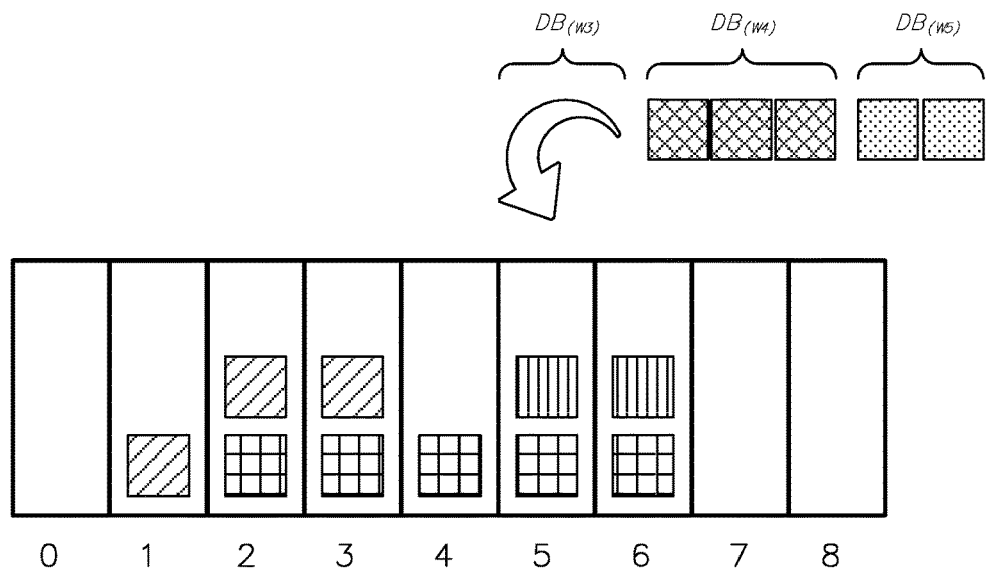
FIG. 1D shows the state of the bins after document identifiers of a third keyword list have been allocated, in accordance with some embodiments.

FIG. 1D shows the state of the bins after the two document identifiers of $DB(w_3)$ have been allocated to bins 5 through 6.

Figure 1E:
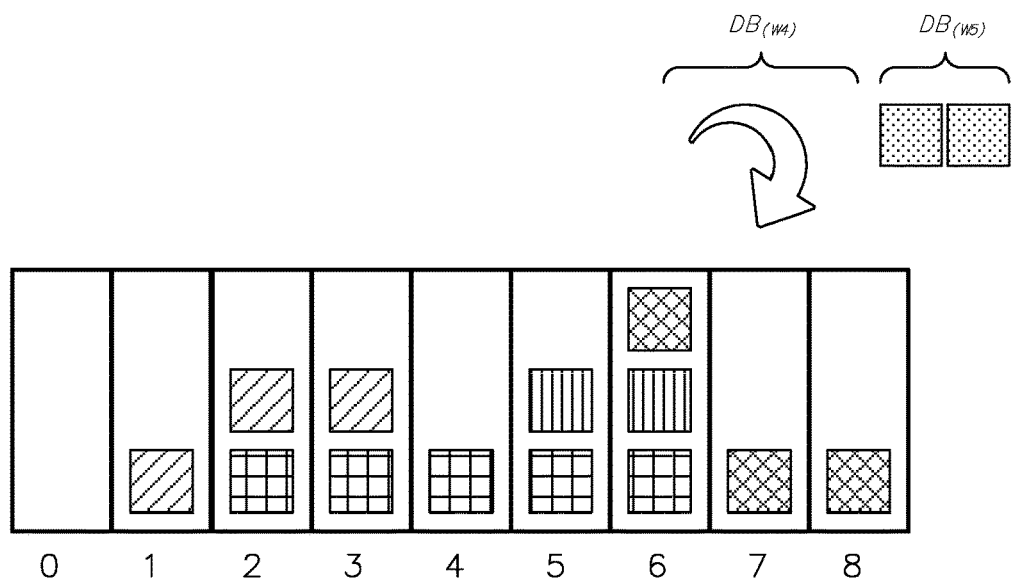
FIG. 1E shows the state of the bins after document identifiers of a fourth keyword list have been allocated, in accordance with some embodiments.

FIG. 1E shows the state of the bins after the three document identifiers of $DB(w_4)$ have been allocated to bins 6 through 8.

Figure 1F:
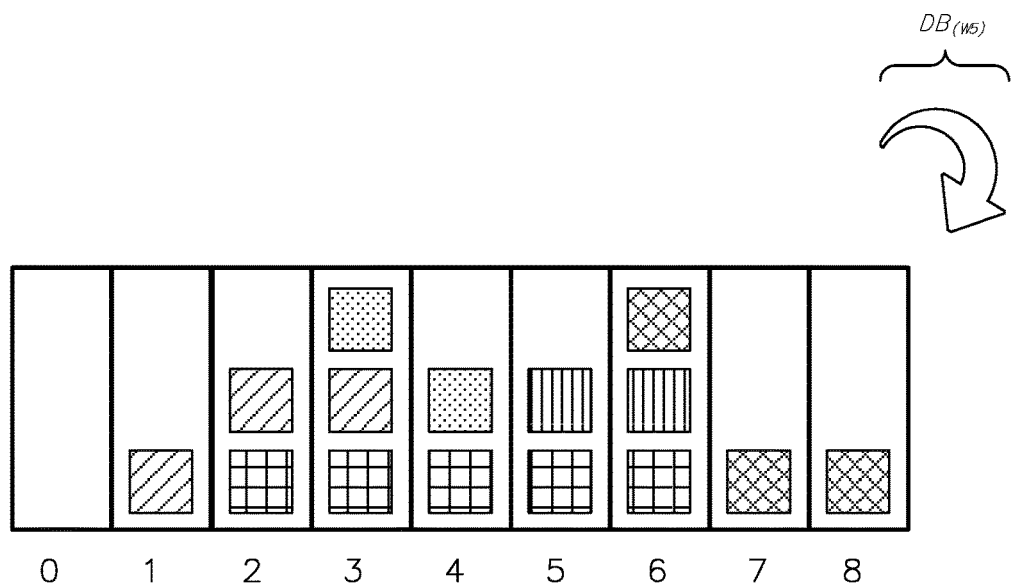
FIG. 1F shows the state of the bins after document identifiers of a fifth keyword list have been allocated, in accordance with some embodiments.
Figure 1G:
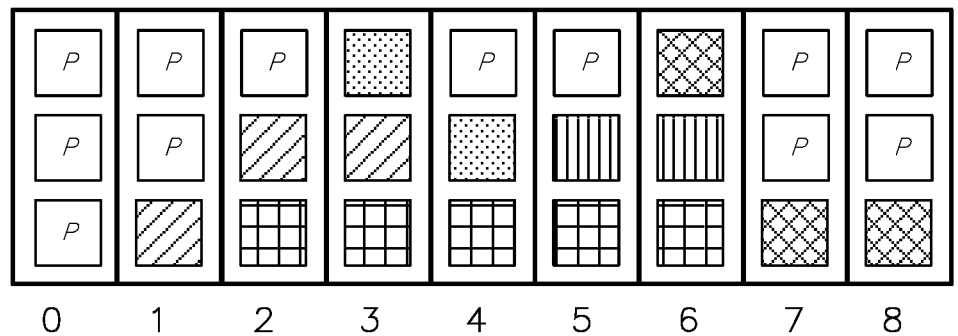
FIG. 1G shows the state of the bins after padding, in accordance with some embodiments.

FIG. 1F shows the state of the bins after the two document identifiers of $DB(w_5)$ have been allocated to bins 6 through 8.

The term "ordered bins" refers to consecutive segments of physical computer memory (i.e., non-transient computer-readable memory).

Present embodiments strive to provide an upper bound to the maximal load of the process (that is, the maximal number of encrypted document identifiers contained in each bin). However, this random process introduces new challenges when compared to its one-dimensional variant: The locations of the encrypted document identifiers in the array of ordered bins are not independent. Specifically, given that a certain bin has many encrypted document identifiers, it is rather likely that its adjacent bins also have many encrypted document identifiers. Nevertheless, by carefully analyzing the dependencies that the lists introduce, present embodiments are able to bound the maximal load. Specifically, present embodiments demonstrate that for any database of size N, if an array of $N/\tilde{O}(\log N)$ bins, each of size $\tilde{O}(\log N)$, is allocated (while making sure that the overall space is linear in N), then with all but a negligible probability there are no overflowing bins.

The process may continue as follows. At least some of the bins (and optionally all of them) are padded to contain exactly $\tilde{O}(\log N)$ document identifiers by adding "dummy" document identifiers when needed. These "dummy" document identifiers are marked with the letter P in FIG. 1G.

Figure 1H:
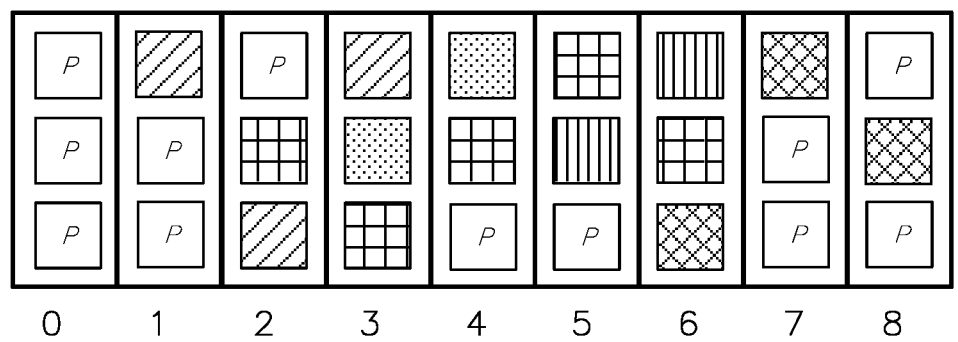
FIG. 1H shows the state of the bins after shuffling, in accordance with some embodiments.

Then, the document identifiers in each bin—both the "dummy" ones and the real ones—may be uniformly shuffled. FIG. 1H shows the bins following this shuffling.

Then, the document identifiers in each list DB(w) are each separately encrypted using an encryption key that is derived from the keyword w (e.g., by using a pseudorandom function that also generates the hash value h(w)). The encryption scheme used is one that produces pseudorandom ciphertexts, and has an elusive and verifiable range.

Figure 1I:
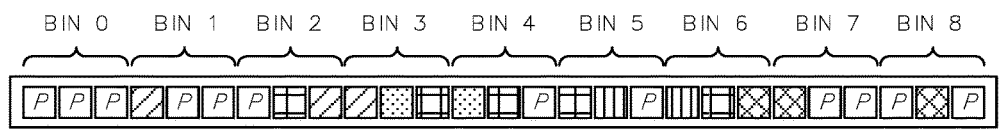
FIG. 1I shows the bins stored at consecutive locations in a non-transient computer-readable memory in accordance with some embodiments.

The bins are then stored at consecutive locations in a non-transient computer-readable memory, wherein these consecutive locations preserve the order of the ordered bins. FIG. 1I illustrates this by a horizontal array of memory locations.

This concludes the creation of the SSE scheme.

Figure 2:
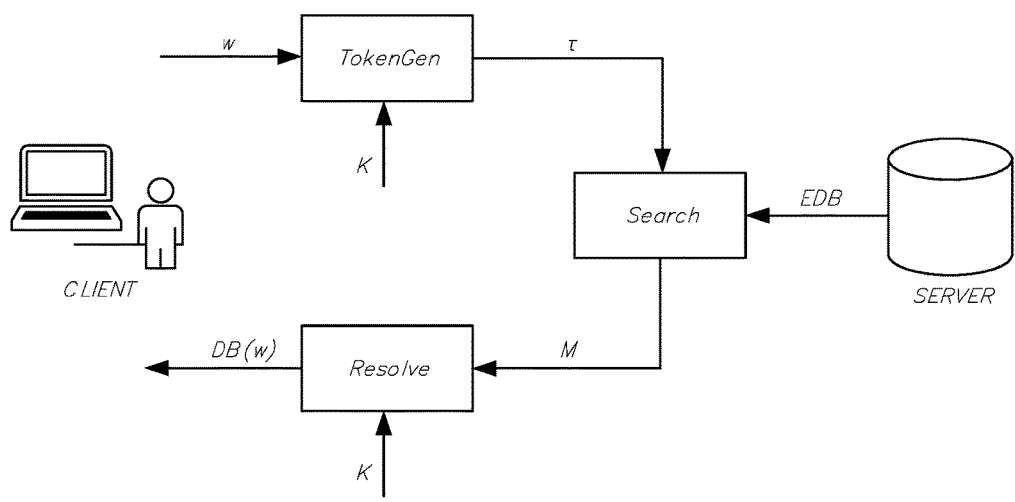
FIG. 2 shows a diagram of creating SSE scheme and a later retrieval of data. in accordance with some embodiments.

Reference is now made to FIG. 2, which shows a diagram of creation of the SSE scheme and a later data retrieval. To later access documents that contain a certain keyword, a server storing the bins may be provided, as a query, with the value h(w) and with the decryption key corresponding to w. The server may recover the entire list DB(w) as follows. The server may access the bin h(w), and attempt to decrypt all of the ciphertexts (the encrypted document identifiers) that are stored therein. Since an encryption scheme with an elusive and verifiable range was used, the server will be successful in decrypting exactly one of these ciphertexts, and this is the first identifier of a document that contains w. The server then proceeds to the bin h(w)+1 and so on until it reaches a bin in which no ciphertext is decryptable.

After the server is in possession of the decrypted ciphertexts, they may be utilized (by that server and/or by a client computer) to access the documents that are pointed to by the recovered document identifiers. These documents may be stored on the same server storing the bins or on one or more other servers. The documents may be encrypted with a key which is optionally not available to the server storing the bins, to ensure security of these documents.

In terms of efficiency, the locality of the above SSE scheme is asymptotically optimal: The server goes to the bin h(w), and from that point it only uses contiguous memory access. In addition, the read efficiency is $\tilde{O}(\log N)$, since for retrieving each document the server reads a bin containing $\tilde{O}(\log N)$ encrypted documents. This yields a scheme with space $O(N)$, locality $O(1)$, and read efficiency $\tilde{O}(\log N)$.

Finally, the security of the scheme is based on the observation that the choices of bins for document identifiers from different lists are statistically-close to being completely independent. Therefore, the access pattern that the server sees (i.e., the values h(w) for different keywords) does not reveal any unnecessary information on the database.

The Two-choice Scheme (which can be Generalized to any Multiple-choice Scheme):

Given a database DB={DB($w_1$), . . . , DB($w_{n_w}$)} of size N, the present two-choice scheme allocates an array of bins and constructs an encrypted database as follows. For each keyword w, two independent hash values, $h_1(w)$ and $h_2(w)$ are computed, and all document identifiers pertaining to documents which contain w are placed in consecutive bins (as in the one-choice scheme) starting either from the bin $h_1(w)$ or from the bin $h_2(w)$ (but not from both). The choice between $h_1(w)$ and $h_2(w)$ as the starting point may be based, for example, on the maximal load of the bins in the relevant range, in every such iteration (i.e., the one with the smaller maximal load at the time of insertion is chosen).

This two-choice variant of the two-dimensional balanced allocations problem turns to be significantly more challenging to analyze. Nevertheless, it is shown herein that under the modest assumption that no keyword appears in more than $N^{1-1/\log \log N}$ documents, this variant indeed obtains an exponential improvement: if an array of $N/\tilde{O}(\log \log N)$ bins each of size $\tilde{O}(\log \log N)$ is allocated (while again making sure that the overall space is linear in N), then with all but a negligible probability there are no overflowing bins. Moreover, it is shown herein that the assumption that no keyword appears in more than $N^{1-1/\log \log N}$ documents is in fact essential for obtaining such an exponential improvement.

Since the two-choice scheme places all elements of a list according to two random choices that are made for the entire list (and not for each element), this process introduces many dependencies between elements, as well as various dependencies between, for example, the loads of any two consecutive bins. Such dependencies make the process significantly more challenging to analyze.

The process may continue as follows. First, each bin may be padded to contain exactly $\tilde{O}(\log \log N)$ document identifiers by adding "dummy" document identifiers when needed. The document identifiers in each bin may be uniformly shuffled. Then, the document identifiers in each list DB(w) are each encrypted using an encryption key that is derived from the keyword w (by using a pseudorandom function as above). As in the one-choice scheme, an encryption scheme that produces pseudorandom ciphertexts, and has an elusive and verifiable range, is used.

In terms of functionality, to later access documents that contain a certain keyword, note that by providing the server with the values $h_1(w)$ and $h_2(w)$, as well as with the number $n_w$ of documents that contain the keyword w, the server can simply send back to the client the content of the $n_w$ consecutive bins starting from the location $h_1(w)$ and the content of the $n_w$ consecutive bins starting from the location $h_2(w)$. The client can then decrypt the content of these bins and recover the list DB(w) using a decryption key that is derived from the keyword w. An additional linear-space hash table may be employed for enabling the server to recover the value $n_w$ on its own, and this scheme does not allow the server to decrypt the content of the bins on its own. This is due to the fact that whether the list DB(w) is stored starting from $h_1(w)$ or $h_2(w)$ may reveal unnecessary information on the structure of the database.

In terms of efficiency, as in the one-choice scheme, asymptotically optimal locality in linear space is obtained, but here the read efficiency is improved from $\tilde{O}(\log N)$ to $\tilde{O}(\log \log N)$: for retrieving each document identifier, the server reads the content of two bins, each of which contains $\tilde{O}(\log \log N)$ encrypted document identifiers.

Finally, the security of the two-choice scheme is based on the observation that the two possible starting locations of document identifiers from different lists in the database are statistically-close to being completely independent. Their actual starting locations are far from being independent, but this information is not revealed to the server since it cannot decrypt the content of the bins. Therefore, the access pattern that the server sees (i.e., the values $h_1(w)$ and $h_2(w)$ for various keywords w) does not reveal any unnecessary information on the database.

Presented now are the notation and basic definitions that are used in this disclosure $\lambda \in \mathbb{N}$ denotes the security parameter. For a distribution X, $x \leftarrow X$ denotes the process of sampling a value x from the distribution X. Similarly, for a set $\chi$, $x \leftarrow \chi$ denotes the process of sampling a value x from the uniform distribution over $\chi$. For an integer $n \in \mathbb{N}$, denoted by [n] is the set $\{1, \ldots, n\}$. A function $\text{negl}: \mathbb{N} \to \mathbb{R}^+$ is negligible if for every constant $c>0$ there exists an integer $N_c$ such that $\text{negl}(n) < n^{-c}$ for all $n > N_c$. All logarithms in this disclosure are to the base of 2.

Let $\lambda$ denote the security parameter. Let $W = \{w_1, \ldots, w_{n_w}\}$ denote the set of keywords, where $n_w$ is polynomial in $\lambda$, and it is assumed that each keyword $w_1$ can be represented using a constant number of machine words, each of length $O(\lambda)$ bits, in the unit-cost RAM model. For each keyword $w_i$, a list DB($w_i$)={$id_1, \ldots, id_{n_i}$} of documents (or document identifiers) is associated, in which the keyword $w_i$ appears. It is assumed that each identifier is of length $O(\lambda)$ bits. Let DB={DB($w_1$), . . . , DB($w_{n_w}$)}, and let $N = \Sigma_{i=1}^{n_w} n_i$ to denote the total number of keyword/identifier pairs in DB. Finally, let $n_{id}$ denote the number of unique identifiers.

A searchable symmetric encryption (SSE) scheme Π, which is schematically shown in FIG. 2, is comprised of algorithms (KeyGen, EDBSetup, TokGen, Search, Resolve) such that:

1. K←KeyGen($1^\lambda$). The key generation algorithm KeyGen takes as input the security parameter $1^\lambda$ and outputs a secret key K.

2. EDB←EDBSetup(K, DB). The database-setup EDBSetup algorithm takes as input a key K and a database DB and outputs an encrypted database EDB.

3. (τ, ρ)=TokGen(K,w). The token generator algorithm is a deterministic algorithm that takes as input the private key K and the keyword w and outputs a token τ to be sent to the server, and some internal state ρ for the resolving algorithm.

4. M=Search(EDB,τ). The searching algorithm Search takes as input the token τ and the encrypted database EDB, and outputs some list M of results.

5. S=Resolve(ρ,M). The resolving algorithm receives the list M and the state, and outputs the set of decrypted results L.

An SSE scheme for databases of size N=N(λ) is correct if for every ppt (Probabilistic Polynomial-Time) adversary A there exists a negligible function negl(•) such that the output of the experiment correct$_{A,DB}$ ($1^\lambda$) is 1 with probability 1−negl(λ) for all sufficiently large $\lambda \in \mathbb{N}$, where the experiment is defined as follows:

1. The adversary A on input $1^\lambda$ outputs a database DB of size $N=N(\lambda)$ together with some state information state.

2. A key $K \leftarrow \text{KeyGen}(1^\lambda)$ is chosen and the database is encrypted by computing $\text{EDB} \leftarrow \text{EDBSetup}(K, DB)$.

3. The adversary A is invoked on input (EDB, state), and can repeatedly issue queries $w_i$, where each query is answered as follows:

$(\tau_i, \rho_i) \leftarrow \text{TokGen}(K, w_i)$, $M_i \leftarrow \text{Search}(\tau_i, \text{EDB})$ and $S_i = \text{Resolve}(\rho_i, M_i)$.

4. The output of the experiment is 1 if and only if for every query $w_i$ it holds that $S_i = DB(w_i)$.

In case where the database is an index of keywords/documents, then the above syntax is a one-round protocol. In case where the database is an index of keyword/identifiers, then this syntax corresponds to a two-round protocol, where the algorithms (TokGen, Search, Resolve) describe the first round, and in which in the second round has the following fixed structure: The client sends S, gets back the corresponding document identifiers and then decrypts them. The single-round syntax for keyword/identifiers index is a sub-case of the above, where there is no Resolve algorithm, no secret state $\rho$, and the algorithm Search simply outputs S (and this is known to the server). Recall that the server then fetches the documents from storage according to the identifiers, and the client decrypts the actual document.

The notions of locality and read efficiency throughout this disclosure follow those introduced by Cash and Tessaro 2014.

Locality: The search procedure of any SSE scheme can be decomposed into a sequence of contiguous reads from the encrypted database EDB. Specifically, assume that the Search algorithm does not get the encrypted database as input, but rather only gets oracle access to it. Each query to this oracle consists of some interval $[a_i, b_i]$, and the oracle replies with the words that are stored on those intervals of EDB. The Search algorithm is invoked on some token $\tau$ and queries its oracle on some interval $[a_1, b_1]$. It continues to compute the next intervals to read based on $\tau$ and all previously read intervals from EDB. These intervals are denoted by $\text{ReadPat}(\text{EDB}, \tau)$.

Definition 2.1 (Locality). An SSE scheme $\Pi$ is d-local (or has locality d) if for every $\lambda$, DB and $w \in W$, $K \leftarrow \text{KeyGen}(1^\lambda)$, $\text{EDB} \leftarrow \text{EDBSetup}(K, DB)$ and $\tau \leftarrow \text{TokGen}(K, w)$ we have that $\text{ReadPat}(\text{EDB}, \tau)$ consists of at most d intervals with probability 1.

Read efficiency. The notion of locality alone is lacking, since the Search algorithm can read the whole database with a single interval. The notion of read efficiency measures the overall size of portion read by a search operation. For a given DB and w, let $\|DB(w)\|$ denote the number of words in the encoding of DB(w).

Definition 2.2 (Read efficiency). An SSE scheme $\Pi$ is r-read efficient (or has read efficiency r) if for any $\Delta$, DB, and $w \in W$, $\text{ReadPat}(\tau, \text{EDB})$ consists of intervals of total length at most $r \cdot \|DB(w)\|$ words.

The standard security definition for SSE schemes follows the known ideal/real simulation paradigm. Both static and adaptive security are considered herein, where the difference is whether the adversary chooses its queries statically (i.e., before seeing any token), or in an adaptive manner (i.e., the next query may be a function of the previous tokens). In both cases, some information is leaked to the server, which is formalized by letting the simulator receive the evaluation of some "leakage function" on the database itself and the real tokens.

Static setting: the real execution. The real execution is parameterized by the scheme $\Pi$, the adversary A, and the security parameter $\lambda$. In the real execution the adversary is invoked on $1^\lambda$, and outputs a database DB and a list of queries $w = \{w_i\}_i$. Then, the experiment invokes the key-generation algorithm and the database setup algorithms, $K \leftarrow \text{KeyGen}(1^\lambda)$ and $\text{EDB} \leftarrow \text{EDBSetup}(K, DB)$. Then, for each query $w = \{w_i\}_i$ that the adversary has outputted, the token generator algorithm is run to obtain $\tau_i = \text{TokGen}(w_i)$. The adversary is given the encrypted database EDB and the resulting tokens $\tau = \{\tau_i\}_{w_i \in w}$, and outputs a bit b.

The ideal execution. The ideal execution is parameterized by the scheme $\Pi$, a leakage function L, the adversary A, a simulator S and the security parameter $\lambda$. In this execution, the adversary A is invoked on $1^\lambda$, and outputs (DB, w) similarly to the real execution. However, this time the simulator S is given the evaluation of the leakage function on (DB, w) and should output EDB,$\tau$ (i.e., $(\text{EDB},\tau) \leftarrow S(L(DB,w)))$. The execution follows by giving (EDB,$\tau$) to the adversary A, which outputs a bit b.

Let $\text{SSE-Real}_{\Pi,A}(\lambda)$ denote the output of the real execution, and let $\text{SSE-Ideal}_{\Pi,L,A,S}(\lambda)$ denote the output of the ideal execution, with the adversary A, simulator S and leakage function L.

Definition 2.3 (static $\mathcal{L}$-secure SSE). Let $\Pi =$ (KeyGen, EDBSetup, TokGen, Search) be an SSE scheme and let $\mathcal{L}$ be a leakage function. We say that the scheme $\Pi$ is static $\mathcal{L}$-secure searchable encryption if for every ppt adversary A, there exists a ppt simulator S and a negligible function negl($\bullet$) such that $|Pr[\text{SSE-Real}_{\Pi,A}(\lambda)=1]-$
$Pr[\text{SSE-Ideal}_{\Pi,L,A,S}(\lambda)=1]|<\text{negl}(\lambda)$.

Adaptive setting. In the adaptive setting, the adversary is not restricted to specifying all of its queries w in advance, but can instead choose its queries during the execution in an adaptive manner, depending on the encrypted database EDB and on the tokens that it sees. Let $\text{SSE-Real}_{\Pi,A}^{adapt}(\lambda)$ denote the output of the real execution in this adaptive setting. In the ideal execution, the simulator S is now an interactive Turing machine, which interacts with the experiment by responding to queries. First, the simulator S is initially invoked on L(DB) and outputs EDB. Then, for every query $w_i$ that A may output, the function $\mathcal{L}$ is invoked on DB and all previously queries $\{w_j\}_{j<i}$ and the new query $w_i$, outputs some new leakage $\ell(w_i)$ which is given to the simulator S. The latter outputs some $t_i$, which is given back to A, who may then issue a new query. At the end of the execution, A outputs a bit b. Let $\text{SSE-Ideal}_{\Pi,L,A,S}^{adapt}(\lambda)$ be the output of the ideal execution. The adaptive security of SSE is defined as follows:

Definition 2.4 (adaptive $\mathcal{L}$-secure SSE). Let $\Pi =$ (KeyGen, EDBSetup, TokGen, Search) be an SSE scheme and let $\mathcal{L}$ be a leakage function. The scheme $\Pi$ is said to be adaptive $\mathcal{L}$-secure searchable encryption if for every ppt adversary A, there exists a ppt simulator S and a negligible function negl($\bullet$) such that $|Pr[\text{SSE-Real}_{\Pi,A}^{adapt}(\lambda)=1]-$
$Pr[\text{SSE-Ideal}_{\Pi,L,A,S}^{adapt}(\lambda)=1]|<\text{negl}(\lambda)$ The leakage function. Following the standard notions of security for SSE, the leakage function $\mathcal{L}_{min}$ is considered for one-round protocols and the leakage function $\mathcal{L}_{sizes}$ for two-round protocols, where $\mathcal{L}_{min}(DB,w)=(N,\{DB(w)\}_{w \in w})$, $\mathcal{L}_{sizes}(DB,w)=(N,\{|DB(w)|\}_{w \in w})$, and $N=\Sigma_{w \in w}|DB(w)|$ is the size of the database. That is, both functions return the size of the database, and the difference between them is that the function $\mathcal{L}_{min}$ returns the actual documents that contain each keyword w∈w that the adversary has queried, whereas the function $\mathcal{L}_{sizes}$ returns only the number of such documents.

The leakage functions in the adaptive setting are defined analogously. That is, for a database DB, a set of "previous" queries $\{w_j\}_{j<i}$, and a new query $w_i$, $\mathcal{L}_{min}^{adap}(DB, \{w_j\}_{j<i}, w_i) = N$ if $(\{w_j\}_{j<i}, w_i) = (\bot, \bot)$ is defined, and $DB(w_i)$ otherwise. Likewise, $\mathcal{L}_{size}^{adap}(DB, \{w_j\}_{j<i}, w_i)$ is defined to be N in case where the input is $(\bot, \bot)$, and $|DB(w_i)|$ otherwise.

Pseudorandom encryption schemes with elusive and verifiable range. In the present scheme, the identifiers of list are encrypted with a different key, and it is required to ensure that a decryption of some ciphertext is valid only when decrypting with the correct key. In addition, the client pads its lists using some random elements, and it is desired to ensure that by doing so it does not accidentally introduce valid ciphertexts for some keys, and that ciphertexts seem independent of their keys. An encryption scheme with the following properties is therefore used.

Definition 2.5. Let (Enc, Dec) be a private-key encryption scheme and denote the range of a key $K \leftarrow \{0,1\}^\lambda$ in the scheme by $\text{Range}(K) \stackrel{def}{=} \{Enc_K(x)\}_{x \in \{0,1\}^n}$. Then, 1. (Enc, Dec) is said to have an elusive range if for every ppt machine A there exists a negligible function $negl(\bullet)$ such that $$\Pr_{K \leftarrow \{0,1\}^\lambda}[A(1^\lambda) \in \text{Range}(K)] < negl(\lambda)$$

2. (Enc, Dec) is said to have an efficiently verifiable range if there exists a ppt machine M such that $M(1^\lambda, K, c) = 1$ if and only if $c \in \text{Range}(K)$. By convention, for every $c \notin \text{Range}(K)$, we have that $Dec_K(c) = \bot$.

3. (Enc, Dec) is said to have pseudorandom ciphertexts if for every ppt adversary A there exists a negligible function $negl(\bullet)$ such that:

$$|\Pr[A^{Enc_K(\cdot)}(1^\lambda) = 1] - \Pr[A^{\mathcal{R}(\cdot)}(1^\lambda) = 1]| \leq negl(\lambda)$$

where $\mathcal{R}$ is a probabilistic oracle that given any input outputs a freshly-sampled uniform value of the appropriate length (i.e., as the output length of $Enc_K(\bullet)$, the probability on the left is taken over the choice $K \leftarrow \{0,1\}^\lambda$ and the internal randomness of the algorithm Enc, and the probability on the right is taken over the randomness of the oracle $\mathcal{R}$.

The Gen algorithm may be omitted since the scheme is a symmetric-key one and thus it can be assumed w.l.o.g. that the key is a uniform string (i.e., the randomness for Gen). It is noted that an encryption scheme that satisfy all these properties can be constructed from any pseudorandom function (and therefore from one-way function) $PRF_K: \{0,1\}^m \to \{0,1\}^{m+\lambda}$ for $K \varepsilon \{0,1\}^\lambda$ as $Enc_K(x) = \langle r, PRF_K(r) \oplus x0^\lambda \rangle$, where $x \varepsilon \{0,1\}^m$, $r \leftarrow \{0,1\}^\lambda$, and $x0^m$ denotes the concatenation of x and $0^\lambda$. This scheme satisfies the first two notions of Y. Lindell and B. Pinkas. A proof of security of Yao's protocol for two-party computation. *Journal of Cryptology*, 22(2):161-188, 2009, and it is easy to see that it has also pseudorandom ciphertexts.

Static hash tables. The present schemes rely on static hash tables (also known as static dictionaries). These are data structures that given a set S can support lookup operations in constant time in the standard unit-cost word-RAM model. Specifically, a static hash table consists of a pair of algorithms denoted (HTSetup, HTLookup). The algorithm HTSetup gets as input a set $S = \{(\ell_i, d_i)\}_{i=1}^k$ of pairs $(\ell_i, d_i)$ of strings, where $\ell_i \varepsilon \{0,1\}^s$ is the label and $d_i \varepsilon \{0,1\}^r$ is the data. The output of this algorithm is a hash table HT(S). The lookup algorithm HT Lookup on input $(HT(S), \ell)$ returns d if $(\ell, d) \varepsilon S$, and $\bot$ otherwise. There exist many constructions of static hash tables that use linear space (i.e., $O(k(r+s))$ bits) and answer lookup queries by reading a constant number of contiguous s-bit blocks and r-bit blocks (see, for example, R. Pagh and F. F. Rodler. Cuckoo hashing. *JOURNAL of Algorithms*, 51(2):122-144, 2004; Y. Arbitman, M. Naor, and G. Segev. Backyard cuckoo hashing: Constant worst-case operations with a succinct representation. In *Proceedings of the 51st Annual IEEE Symposium on Foundations of Computer Science*, pages 787-796, 2010; and the many references cited therein).

The proofs in this disclosure rely on the following standard tail-bound inequalities for sequences of random variables (see, for example, M. Mitzenmacher and E. Upfal. Probability and computing—randomized algorithms and probabilistic analysis. Cambridge University Press, 2005; and M. Dietzfelbinger and R. Pagh. Succinct data structures for retrieval and approximate membership. In *Proceedings of the 35th International Colloquium on Automata, Languages and Programming*, pages 385-396, 2008).

Lemma 2.6 (Multiplicative Chernoff bound). Suppose $X_1, \ldots, X_n$ are independent random variables taking values in $\{0,1\}$. Let X denote their sum and let $\mu = E[X]$ denote the sum's expected value. Then for any $\delta > 0$, $$\Pr[X > (1+\delta)\mu] \leq \left(\frac{e^\delta}{(1+\delta)^{(1+\delta)}}\right)^\mu.$$

Lemma 2.7. Suppose $X_1, \ldots, X_n$ and $Y_1, \ldots, Y_n$ are random variables such that each $Y_i$ takes values in $\{0,1\}$, $Y_i = Y_i(X_1, \ldots, X_i)$ and $\Pr[Y_i = 1 | X_1, \ldots, X_{i-1}] \leq p$ for some $p \varepsilon [0,1]$. Let $Z_1, \ldots, Z_n$ be independent Bernoulli trials with success probability p. Then for any non-negative coefficients $c_1, \ldots, c_n$ and a bound k, $$\Pr\left[\sum_{i=1}^n c_i Y_i > k\right] \leq \Pr\left[\sum_{i=1}^n c_i Z_i > k\right].$$

Lemma 2.7 can be proved using a standard coupling argument (i.e., defining a joint probability distribution where always $Y_i \leq Z_i$).

Claim 2.8 (Bernstein bound). Let $W_1, \ldots, W_n$ be independent zero-mean random variables. Suppose that $|W_j| \leq M$ for all j. Then, for any $t > 0$, $$\Pr\left[\sum_{i=1}^n W_i > t\right] \leq \exp\left(-\frac{\frac{1}{2}t^2}{\sum_j E[W_j^2] + \frac{1}{3}Mt}\right).$$

Given Lemma 2.7's conditions, denote $N = \sum_{i=1}^n c_i$ and $M = \max c_i$. Then, $$\Pr\left[\sum_{i=1}^n c_i Y_i > 2Np\right] \leq \left(-\frac{3}{8}\frac{N}{M}p\right).$$

Let $Z_1, \ldots, Z_n$ be the i.i.d. variables mentioned in the statement of Lemma 2.7. Set $W_i = c_i(Z_i - p)$. Then $E[W_i] = 0$, $|W_i| \le c_i \max(1-p, p) \le c_i$ and $E[W_i^2]=p(1-p)c_i^2$. Applying Lemma 2.7 and the Bernstein bound, we get $$Pr\left[\sum_{i=1}^n c_i Y_i > 2Np\right] \le Pr\left[\sum_{i=1}^n c_i Z_i > 2Np\right]$$

$$= Pr\left[\sum_{i=1}^n W_i > Np\right]$$

$$\le \exp\left(-\frac{\frac{1}{2}N^2 p^2}{p(1-p)\sum_{i=1}^n c_i^2 + \frac{1}{3}MNp}\right)$$

$$\le \exp\left(-\frac{\frac{1}{2}N^2 p^2}{pMN + \frac{1}{3}MNp}\right) = \exp\left(-\frac{3}{8}\frac{N}{M}p\right),$$

where we used the fact that $\sum_{i=1}^n c_i^2 \le \sum_{i=1}^n c_i M = NM$.

The following section analyzes the maximal load of two schemes for the two-dimensional balanced allocation problem, as discussed above.

The input to the two-dimensional balanced allocation problem is a collection of lists, $L_1, \ldots, L_k$, where the $i^{th}$ list $L_i$ is of length $n_i$. The goal in this problem is to allocate an array of bins and to place each element from these lists in a bin (where a bin may contain several elements), such that given an index i we can efficiently recover the entire list $L_i$. Motivated by the goal of searchable symmetric encryption, the present allocation scheme has good space overhead, locality, and read efficiency (while ignoring any security properties for now).

A One-Choice Allocation Scheme:

As discussed above, for each list $L_i$ a uniform bin is chosen, and then the elements of $L_i$ are placed in consecutive bins starting from that bin (one element in each bin).

Algorithm 1 (Algorithm OneChoiceAllocation(m, $(n_1, \ldots, n_k)$)):
Input: Number of bins m, and a vector of integers $(n_1, \ldots, n_k)$ representing the length of the lists $L_1, \ldots, L_k$.
The Algorithm:
 Initialize m empty bins $B_0, \ldots, B_{m-1}$.
 For each list $L_i$ where i=1, ..., k:
  (a) Sample $a \leftarrow \{0, 1, \ldots, m-1\}$.
  (b) For j=0, ..., $n_i$-1:
   i. Place the jth element of the list $L_i$ in bin $B_{a+j \bmod m}$.

It is shown here that for an appropriate choice of parameters, the maximal load is very close to its expectation. This is similar to the one-dimensional problem that considers balls instead of lists, and the locations of all balls are independent. In the present case, the locations of the elements from the same list are clearly related, and the loads of any two consecutive bins are strongly correlated. This requires a more subtle analysis, and the following theorem is proven in G. Asharov, M. Naor, G. Segev, and I. Shahaf. Searchable symmetric encryption: Optimal locality in linear space via two-dimensional balanced allocations. Cryptology ePrint Archive, Report 2016/251, 2016 (hereinafter "Asharov 2016"):

Claim 3.2. Fix any m, k, and $n_1, \ldots, n_k$. Let $n = \sum_{i=1}^k n_i$ and assume that m≤n. Then, with probability at least $1 - m \cdot 2^{-n/m}$, at the end of Algorithm 3.1 the maximal load of any bin is at most 3n/m.

Proof. For simplicity, it is first assumed that there is no list with more than elements. This assumption is later removed.

For $0 \le j \le m-1$, let $X_j$ be a random variable denotes the load of bin $B_j$, and for every i=1, ..., k, let $Y_j[i]$ be an indicator that gets 1 if and only if some element of the ith list falls into bin $B_j$. Note that $X_j = \sum_{i=0}^{k-1} Y_j[i]$. Moreover, for a fixed $j \in \{0, \ldots, m-1\}$, $i \in \{1, \ldots, k\}$, we have:

$$E(Y_j[i]) = \frac{n_i}{m}.$$

This holds since there is no list with size greater than, and therefore there is an element of some list L in bin $B_j$ if and only if, the chosen placement for the head of the list is one of the values $\{j, [(j-1) \bmod m], \ldots, [(j-n_i+1) \bmod m]\}$.

This implies that:

$$E[X_j] = E\left[\sum_{i=0}^{k-1} Y_j[i]\right] = \sum_{i=0}^{k-1} E[Y_j[i]] = \frac{\sum_{i=0}^{k-1} n_i}{m} = \frac{n}{m}.$$

Although the random variables $X_0, \ldots, X_{-1}$ are dependent (i.e., the loads of the bins), and even for every list the random variables $Y_0[i], \ldots, Y_{-1}[i]$ are dependent (i.e., the bins where the elements of some single list are placed), for every fixed $j \in \{0, \ldots, -1\}$ the random variables $Y_j[1], \ldots, Y_j[k]$ are independent (i.e., the choices of elements inside a given bin). Also, they all taking values in $\{0,1\}$. Therefore, we can apply Chernoff's bound (the Lemma above) and get:

$$Pr[X_j \ge (1+\delta)E[X_j]] \le \left(\frac{e^\delta}{(1+\delta)^{(1+\delta)}}\right)^{E[X_j]}$$

For $\delta \ge e-1$, we have that:

$$\frac{e^\delta}{(1+\delta)^{(1+\delta)}} = \frac{1}{1+\delta} \cdot \left(\frac{e}{1+\delta}\right)^\delta \le \frac{1}{1+\delta} \le \frac{1}{2},$$

and thus $$Pr\left[X_i \ge 3 \cdot \frac{n}{m}\right] \le 2^{-n/m}.$$

Using union-bound, we conclude that the probability that one of the bins has load greater than $3 \cdot n/m$ is at most $2^{-n/m}$.

For case where there exist lists with size greater than, observe that for each such a list i, each bin will have at least $\lfloor n_i/m \rfloor$ element of that list, and exactly $[n_i \bmod m]$ bins will have an additional one element from that list. For each such a list and for each bin $B_i$, instead of considering the single random variable $Y_j[i]$, we define $\lfloor n_i/m \rfloor + 1$ random variables $Y_j^{(0)}[i], \ldots, Y_j^{(\lfloor n_i/m \rfloor)}[i]$, where $Y_j^{(\gamma)}[i]$ indicates whether at least γ elements of the ith list fell into bin $B_j$. The first $\lfloor n_i/m \rfloor$ variables are constant, and always get 1. The random variable $Y_j^{(\lfloor n_i/m \rfloor)}[i]$ is 1 with probability $[n_i \bmod m]/m$. The expected sum of these random variables is $n_i/m$, and therefore $E[X_j] = n/m$, as in the simplified case. Again, these variables are independent and get values in $\{0,1\}$, so we can apply the Chernoff bound and get exactly the same result.

When constructing the present symmetric searchable encryption schemes, we are interested in having a negligible failure probability, and we derive the following corollary from Claim 3.2:

Corollary 3.3. Fix any k, and $n_1, \ldots, n_k$. Let $n=\sum_{i=1}^{k} n_i$ and $$m = \frac{m}{\log n \cdot \log \log n}.$$

Then, with probability at least $1-n^{-\omega(1)}$, at the end of Algorithm ?? the maximal load of any bin is at most 3 log n·log log n.

A Two-Choice Allocation Scheme

The next step is generalizing the one-choice allocation scheme into a two-choice one. Before describing this second scheme, we first discuss several possible generalizations that seem very reasonable and natural, but turn out somewhat insufficient and do not provide the desired properties.

Consider an algorithm that for every list $L_i$ chooses two possible bins, $B_{a_1}$ and $B_{a_2}$, and places the elements of the list in a consecutive manner starting from the least loaded bin $B_{a_i}$ among these two choices. However, this approach seems insufficient, since the fact that $B_{a_i}$ is the least loaded bin among the two possible bins $B_{a_1}$ and $B_{a_2}$ does not imply that $B_{a_i+j}$ is the least loaded bin among $B_{a_1+j}$ and $B_{a_2+j}$ for any j>1. That is, the decision we make in order to place the head of the list does not necessarily apply for the placement of the following element of the list. Another natural approach is the following. Similarly to the previous proposal, for each list we choose two possible locations, $B_{a_1}$ and $B_{a_2}$, and place its first element in the least loaded bin among these two possibilities. However, unlike the previous proposal, we make a similar decision for each element of the list. Specifically, the jth element of the list is placed in the least loaded bin among $B_{a_1+j-1}$ and $B_{a_2+j-1}$. Unfortunately, this algorithm seems somewhat difficult to analyze as it introduces many (redundant) dependencies between elements, and there are too many decisions that are made in the algorithm. A more elegant approach would be to have a single comparison for the placement of the entire list.

We now turn to describe the two-choice approach. Assume without loss of generality that the lengths of all lists are powers of two (otherwise we can pad each with dummy elements and thus increase the database size at most by a factor of 2), and that the number of bins is also a power of two. In the present algorithm, we process the lists according to their length. We first sort the lists in a descending order, and then, for a given list of size $n_i$, we view each block of $n_i$ consecutive bins as a single possible "super bin". As a result, the possible locations for the head of the list is not m (the overall number of bins), but rather only $m/n_i$, the number of "super bins". Then, we choose two possible super bins, and place the entire list, in the least loaded super bin among these two possible choices. The actual placement is done element by element, in the respective bins that constitute this super bin (i.e., one element per "standard" bin).

This approach has the following advantages: First, the entire list is placed according to a single comparison, which significantly simplifies the analysis. Second, all the elements of each list are placed at the exact same level. That is, our algorithm has the following invariant: Whenever we place a list, all the bins that constitute a possible super bin have the exact same number of elements. This is mainly due to the fact that we place the lists in descending order, and in each iteration the super bins are split into smaller super bins that each matches the size of the current list. A formal description is presented as Algorithm 3.4.

Algorithm 3.4 (Algorithm TwoChoiceAllocation(m, $(n_1, \ldots, n_k)$)):

Input: Number of bins m and a vector of integers $(n_1, \ldots, n_k)$ representing the length of the lists $L_1, \ldots, L_k$. We let $n=\sum_{i=1}^{k} n_i$, and assume for concreteness that m and the $n_i$'s are powers of two, and that $m \geq n_1 \geq n_1 \geq \ldots \geq n_k$.

The Algorithm:
1. Initialize m empty bins $B_0, \ldots, B_{m-1}$.
2. For each list $L_i$ where $i=1, \ldots, k$:
   (a) Choose $$\alpha_1 \alpha_2 \leftarrow \left\{0, \ldots, \frac{m}{n_i} - 1\right\}$$

independently and uniformly at random. Consider the two super bins $\tilde{B}_{a_1} = (B_{n_i \cdot a_1 + j})_{j=0}^{n_i - 1}$ and $\tilde{B}_{a_2} = (B_{n_i \cdot a_2 + j})_{j=0}^{n_i - 1}$.

(b) Let $\tilde{B}_a$ be the least loaded among $\tilde{B}_{a_1}$ and $\tilde{B}_{a_2}$. We place the list $L_i$ in the super bin $\tilde{B}_a$. That is, for every $j=0, \ldots, n_i - 1$:
   i. Place the jth element of the list $L_i$ in the bin $B_{n_i \cdot a + j}$.

Bounding the Maximal Load.

The following theorem is now proved:

Theorem 3.5. Assume that each $n_i$ is a power of two and that $n_1 \geq \ldots \geq n_k$. Let $S \geq n_1$ be some bound on the sizes, and let m be the number of bins. Then
1. With probability $1-n^{-\Omega(\log n)}$, there are at most $S \log^2 n$ elements at level greater than $$\frac{4n}{m} + \log\log\frac{n}{S} + 2.$$

2. Let $\varepsilon > 0$, $S = n_{1-\varepsilon}$, and assume that $$m \geq \frac{n}{\log n}.$$

Then for any non-decreasing function $f(n)$ satisfying $f(n) = \Omega(\log \log n)$, $f(n) = O(\sqrt{\log n})$ and $f(2n) = O(f(n))$, the maximal load is at most $$\frac{4n}{m} + O(\log \varepsilon^{-1} \cdot f(n))$$

with probability $1 - O(\log \varepsilon^{-1}) \cdot n^{-\Omega(\varepsilon \cdot f(n^\varepsilon))}$.

For the present searchable symmetric encryption schemes, we will rely on the following corollary (say, with A=1) that follows from Theorem 3.5:

Corollary 3.6 For any constant $A \geq 1$, let $\varepsilon = (\log \log n)^{-A}$ (and so the size of the maximal list is bounded by $n^{1 - 1/(\log \log n)A}$) and $$m = \frac{n}{(\log \log n)^A \cdot (\log \log \log n)^2}.$$

Then with overwhelming probability the maximal load is $O((\log \log n)^A \cdot (\log \log \log n)^2)$.

Proof overview. The proof is rather subtle, and is inspired by the "layered induction" technique of the one-dimensional problem (Y. Azar, A. Z. Broder, A. R. Karlin, and E. Upfal. Balanced allocations. SIAM Journal on Computing, 29(1): 180-200, 1999; M. Mitzenmacher, A. W. Richa, and R. Sitaraman. The power of two random choices: A survey of techniques and results. In Handbook of Randomized Computing, pages 255-312, 2000; and M. Mitzenmacher and E. Upfal. Probability and computing randomized algorithms and probabilistic analysis. Cambridge University Press, 2005.) The following overview is rather simplified, and the formal proof can be found in Asharov 2016.

In order to bound the maximal load, we need to approximately bound the number of bins with j elements for every value of j. The proof defines a sequence of values $\beta_1$, $\beta_2$, . . . and shows that the number of bins with load at least j is bounded by $\beta_j$ with high probability. The proof follows by induction, where in each step, we show that if the number of bins with load at least j is at most $\beta_j$, then with high probability, the number of bins with load at least j+1 is at most $\beta_{j+1}$. The values $\beta_1$, $\beta_2$, . . . are defined according to a recursive relation. Intuitively, the sequence $\beta_1$, $\beta_2$, . . . is monotonic decreasing, and we look for the first j for which $\beta_j<1$ (i.e., there are no bins with load at least j). As we will see, this description is a bit simplified and we cannot actually use the recursive relation all the way to $\beta_j<1$, since the induction does not hold unconditionally. Thus, we will have to stop at a larger $\beta_j$ and conclude the proof using some additional arguments. We will elaborate on this point later on.

The recursive relation. According to the present algorithm, when we place the ith list, all of its elements share the exact same level. Therefore, a list will have height (or, level) at least j+1 only if the two choices for its super bins are of level at least j. Since there are at most $\beta_j$ bins with load at least j (or, $\beta_j/n_i$ super bins of size $n_i$) and m bins (or, $m/n_i$ super bins of size $n_i$), the probability that the two possible choices have level at least j is $(\beta_j/m)^2$. Therefore, the expected number of list elements of height at least j+1 is at most $n \cdot (\beta_j/m)^2$, and so the number of list elements of height at least j+1 is no more than twice this amount with high probability (using some tail bound). This implies that there are no more than $2n \cdot (\beta_j/m)^2$ bins with height at least j+1 and this leads to the following recursive relation:

$$\beta_{j+1} \stackrel{def}{=} 2n \cdot \left(\frac{\beta_j}{m}\right)^2.$$

The induction. We confirm the recursive relation by induction. We prove that with high probability, the number of bins with list elements of height at least j+1 is bounded by $\beta_{j+i}$, conditioned that the number of binis with load at least j is bounded by $\beta_j$. This step is somewhat subtle in the original proof, primarily because one must handle the conditioning appropriately, and the formal argument requires some care. In our case, the argument is even more subtle. In the original proof, this step is shown using Chernoff's bound, however, we cannot use this bound here due to the fact that the random variables do not take values in {0,1}, and depend on the lengths of the lists. We use Bernstein's bound instead, and this step already introduces our limitation on the length of the longest list.

Concluding the first part of Theorem 3.5. The proof then proceeds as follows, where for this high-level overview, we assume for simplicity that m=n. We may set $\beta_4=n/4$, since there cannot be more than n/4 bins with at least 4 elements. As in the original proof, the induction step does not hold unconditionally, and therefore we cannot use the recursion all the way to the first index k for which $\beta_k<1$. Instead, we have to stop earlier, when $\beta_j=S \log^2 n$ where S is some upper bound on the length of the longest list. It turns out that the original proof is a special case of ours, where this layered induction holds as long as $\beta_j \geq \log^2 n$ (i.e., S=1). The first index j* for which $\beta_{j*}=S \log^2 n$ is when j*=O(log log(n/S)). This means that there are no more than $S \log^2 n$ list elements at level greater than O(log log(n/S)), proving the first part of Theorem 3.5.

The second part of Theorem 3.5. At this stage, we cannot use the tail bound any more and we need a different (more coarse) argument. Clearly, if there is a bin with load at least j*+a, then there are at least a lists with height at least j*+1. Assuming that there are no more than $\beta_{j*}=S \log^2 n$ bins with load at least j*, using a simple union bound argument, we can bound the probability that there are at least a lists with height at least j*+1 by roughly $(S^2/n)^a$. This is negligible if a=O(log log n) and $S=n^\delta$ for some constant $\delta<\frac{1}{2}$. Combining this with the above, we conclude that the maximal load of the process is O(log log n) assuming that there are no lists with more than $n^\delta$ elements.

A scaling argument. The above shows that the algorithm places lists of length up to $n^\delta$ for some constant $\delta<\frac{1}{2}$(say, for concreteness, $\delta=\frac{1}{3}$). We claim that the algorithm actually succeeds in placing much longer lists, and we show this using a more subtle argument.

Our first observation is that the algorithm can be "scaled". Namely, consider the following two executions of the algorithm. In the first execution, we have list of lengths $(n_1, \ldots, n_k)$ and number of bins m where all are multiples of some s. In the second execution, instead of running the algorithm on these inputs, we divide the elements to blocks of size s, run the algorithm on the input $(n_1/s, \ldots, n_k/s)$ and m/s, and then extend each bin to s bins (by placing the blocks in the respective bins). This, in fact, is what implicitly happens in the first execution, and therefore these two executions are equivalent.

As a matter of fact, using the behavior of the algorithm on the latter case we can conclude its properties on the former. Specifically, let n'=n/s (i.e., n' is the sum of lengths in the scaled case). The failure probability of this execution is about $(S^2/n')^a$ and it can handle lists of length at most $n'^{1/3}$, which implies that the former case in fact fails with probability about $(S^2/(n/s))^a$ and handles lists of lengths at most $(n/s)^{1/3}$. By taking $s=n^{1/3}$, we obtain that the algorithm can handle lists of lengths between $s=n^{1-(2/3)^1}$ and $n^{1-(2/3)^2}$ with all but negligible probability. We can repeat this argument carefully, and show that the algorithm can handle lists of length between $n^{1-(2/3)^a}$ and $n^{1-(2/3)^{a+1}}$ with all but negligible probability, for any constant a>0.

Our second observation is that the algorithm can in fact handle all of these possible inputs simultaneously. This is because the algorithm behaves similarly to an algorithm that divides the lists into sets of inputs of lengths between $n^{1-(2/3)^a}$ and $n^{1-(2/3)^{a+1}}$, invokes the algorithm on each set of inputs independently (i.e., on a different set of bins), and then combines the bins of all these executions. By carefully defining the number of sets, we conclude that the maximal load of the latter algorithm is at most Õ(log log n), implying that our algorithm behaves similarly to that as well. The full proof of Theorem 3.5 appears in Asharov 2016.

The following section presents a general framework for basing searchable symmetric encryption schemes on the present two-dimensional balanced allocation algorithm.

An allocation algorithm receives as input a database $DB=\{DB(w_1), \ldots, DB(w_{n_w})\}$ and places its elements in an array. For each list $DB(w_i)$, we distinguish between its possible locations in the array, and its actual locations in the array. We restrict our attention to allocation algorithms in which the possible locations of each list $DB(w_i)$ depend only on its length $n_i=|DB(w_i)|$ and on the size $N=\Sigma_{i=1}^{n_W}|DB(w_i)|$ of the database. In particular, the possible locations of different lists are independent (in contrast, the actual locations of different lists are naturally allowed to be dependent). We model this property by considering allocation algorithms that follow a two-step structure. First, they separately generate the possible locations for each list using a procedure denoted RangesGen. Then, given the entire collection of possible locations of all list, they determine the actual locations of the lists using a procedure denote Allocation. The structure of the algorithm is described as Structure 4.1.

Structure 4.1 (The structure of the allocation algorithm Allocation–Alg). Input: k integer values $(n_1, \ldots, n_k)$ representing the lengths of the lists. Let $N=\Sigma_{i=1}^{k} n_i$.
The Algorithm:
1. For every $1 \leq i \leq k$ let $R_i \leftarrow \text{RangesGen}(N, n_i)$.
   (The procedure RangesGen(N, $n_i$) outputs the possible ranges $R_i=\{[a_1, b_1], \ldots, [a_d, b_d]\}$ for the ith list.)
2. Let map$\leftarrow$Allocation$((n_i, R_i), \ldots, (n_k, R_k))$.
   (The array map holds the actual locations of the lists. Each entry in this array contains either a pair (i,j) representing that this entry is the actual location of the jth element from the ith list, or NULL representing an empty entry.)
3. Output map.

We sometimes find it convenient to denote by RangesGen (N, $n_i$; r) an invocation of the procedure RangesGen on input (N, $n_i$) using specific randomness r.

Efficiency measures. We measure the efficiency of an allocation algorithm of the above structure with respect to its space overhead, its locality, and its read efficiency.

Definition 4.2. We say that Allocation–Alg=(RangesGen, Allocation) is an (s, d, r)-allocation algorithm, for some functions $s(\cdot)$, $d(\cdot)$ and $r(\cdot)$, if the following properties hold:
1. Correctness: There exists a negligible function $\text{negl}(\cdot)$ such that for every input $(n_1, \ldots, n_k)$:

$$Pr[(\text{Allocation-}Alg(n_1, \ldots, n_k)=\perp) \vee \text{invalid-allocation}] \leq \text{negl}(N),$$

where $N=\Sigma_{i=1}^{k} n_i$, and invalid–allocation denotes the event in which Allocation–Alg $(n_1, \ldots, n_k)$ outputs an allocation such that there exists two different actual placements for some element, or that there exists some element with no actual placement. The probability is taken over the internal coin tosses of the algorithm Allocation–Alg.
2. Space: For every input $(n_1, \ldots, n_k)$, the array produced by Allocation–Alg is of size at most $s(N)$, where $N=\Sigma_{i=1}^{k} n_i$.
3. Locality: For every input (N, $n_i$), the algorithm RangesGen outputs at most $d(N)$ ranges.
4. Read efficiency: For every input (N, $n_i$) for the algorithm RangesGen it holds that:

$$\frac{\sum_{j=1}^{d}|b_j - a_j|}{n_i} \leq r(N),$$

where $\{[a_1, b_1], \ldots, [a_d, b_d]\} \leftarrow \text{RangesGen}(N, n_i)$.

Concrete instantiations. The two-dimensional balanced allocation schemes described above have the above-discussed two-step structure (more accurately, they can be easily re-written as algorithms that follow this structure).

From Corollaries 3.3 and 3.6 we obtain that our one-choice scheme OneChoiceAllocation (Algorithm 3.1) is an (O(N), O(1), Õ(log N))-allocation algorithm, and that our two-choice scheme TwoChoiceAllocation (Algorithm 3.4) is an (O(N), O(1), Õ(log log N))-allocation algorithm for databases in which no list has more than $N^{1-1/\log \log N}$ elements.

From Allocation Algorithms to SSE Schemes:

We show a generic transformation from any allocation algorithm Allocation–Alg=(RangesGen, Allocation) to a searchable symmetric encryption scheme. In our SSE scheme, the client will run the RangesGen and the Allocation procedures, and then encrypt each of the document identifiers from list DB(w) with a key that is derived from the keyword w using a pseudorandom function. In addition, any unused entry in the array will be filled with a uniform random string of the appropriate length. Then, when issuing a query corresponding to a keyword w, the client will ask the server to retrieve the encrypted content of all possible locations of the list DB(w). Since these locations are chosen independently at random, this does not reveal any information on the list except for its length. The client then decrypts the contents using the respective key for the list. The formal construction is described in Construction 4.3.

Construction 4.3
Parameters: A keyword set $W=\{w_1, \ldots, w_{n_W}\}$, and a database $DB=\{DB(w_1), \ldots, DB(w_{n_W})\}$. We denote by $N=\Sigma_{i=1}^{n_W}|DB(w_i)|$ the size of the database, and for each keyword $w_i$ we denote by $n_i=|DB(w)|$ the number of documents containing $w_i$. Key generator. The algorithm KeyGen $(1^\lambda)$ samples a PRF key K.
Setup. The algorithm EDBSetup(DB, K) proceeds as follows:
1. Initialize an empty set S.
2. For every keyword $w_i \varepsilon W$:
   (a) Let $DB(w_i)=\{id_1^{(i)}, \ldots, id_{n_i}^{(i)}\}$.
   (b) Compute $(\ell_i, k_i, r_i, K_i)=\text{PRF}_K(w_i)$.
   (c) Compute $\hat{n}_i = n_i \oplus k_i$.
   (d) Add the pair $(\ell_i, \hat{n}_i)$ to the set S.
   (e) Compute $R_i=\text{RangesGen}(N, n_i; r_i)$.
3. Pad S until it contains exactly N pairs with random elements. Uniformly shuffle S and compute HT$\leftarrow$HT-Setup(S).
4. Compute map$\leftarrow$Allocation$(\{(n_i, R_i)\}_{i=1}^{n_W})$. If map$=\perp$ then abort and output $\perp$. Otherwise, define the data block Data of size s(N) as follows, where for every $1 \leq t \leq s(N)$:

$$\text{Data}[t] = \begin{cases} Enc_{K_i}(id_j^{(i)}) & \text{if } map[t] = (i, j) \\ U_\ell & \text{otherwise} - 1ex \end{cases} \quad (1)$$

where $U_\ell$ denote a uniformly and independently sampled $\ell$-bit string for each entry.
5. Output: EDB=(Data, HT).
Token generator. The algorithm TokGen(K, $w_i$) computes the derived keys $(\ell_i, k_i, r_i, K_i)=\text{PRF}_K(w_i)$. It outputs $\tau_i=(\ell_i, k_i, r_i)$ as the public token, and $\rho_i=K_i$ as the secret state for the algorithm Resolve.
Search. The algorithm Search($\tau_i$, EDB), with $\tau_i=(\ell_i, k_i, r_i)$ and EDB=(Data, HT) proceeds as follows:
1. Obtain $\hat{n}_i \leftarrow \text{HTGet}(HT, \ell_i)$ and compute $n_i=\hat{n}_i \oplus k_i$.
2. Run RangesGen(N, $n_i$; $r_i$). Let $P=\{[a_1, b_1], \ldots, [a_d, b_d]\}$ be the resulting ranges.
3. Output $\tilde{D}=\cup_{[a_j, b_j] \varepsilon P} \text{Data}[a_j, \ldots, b_j]$.

Resolve. The algorithm Resolve $(\rho_i, \tilde{D})$ with $\rho_i=K_i$, decrypts each element in $\tilde{D}$ using the key $K_i$, and returns the set for which the decryption was successful.

Theorem 4.4. Assume that PRF is a pseudorandom function, and that (Enc, Dec) has pseudorandom ciphertexts, as well as elusive and efficiently verifiable range. Moreover, let Allocation–Alg be an (s, d, r)-allocation algorithm. Then, Construction 4.3 is an adaptive $L_{size}^{adap}$-secure searchable symmetric encryption scheme, with space O(s(N)), locality O(d (N)), and read efficiency O(r(N)).

Proof. The correctness of the scheme follows from the elusive and verifiable range properties of the underlying encryption scheme, and from the correctness of the procedure Allocation–Alg. In particular, from the correctness of the latter procedure and the pseudorandomness of PRF (i.e., the $r_i$'s are computationally indistinguishable from uniform values), we have all placeholders for all elements of all lists in the array map. Then, we use this array to create the array Data. From the verifiable range property, encryptions under different keys do not "collide". In addition, since the encryption scheme has elusive range, the random elements that the client introduces (see Eq. (1)) do not collide with valid encryptions of any of the actual elements. Furthermore, with all but a negligible probability, encryptions under one key are not valid for other keys, and the probability that the same label $\ell_i$ or the same key $K_i$ appear more than once is negligible due to the pseudorandomness of PRF.

Regarding the efficiency, the size of the encrypted database is |Data|+|HT|, where |Data| is of size s(N) and HT contains exactly N elements of at most log N=O(log $\lambda$) bits each (and thus can be stored using O(N) machine words in the unit-cost RAM model). Therefore, the space usage is O(s(N)+N)=O(s(N)) (note that s(N)≥N always hold). Locality and read efficiency are straightforward.

We now prove the adaptive security of the scheme with respect to the leakage function $L_{size}^{adap}$. Recall that in both the real and the ideal executions, the adversary A first outputs DB. In the real execution, it then receives the encrypted database EDB←EDBSetup(K, DB). In the ideal execution, the (interactive) simulator S receives $L_{size}^{adap}$(DB)=N and has to generate EDB. Then, A adaptively issue queries w. For each query $w_i \varepsilon w$, in the real execution it receives the token $\tau_i$←TokGen(K, $w_i$), and in the ideal execution the simulator S receives $L_{size}^{adap}$(DB,$\{w_j\}_{j<i},w_i$)= |DB($W_i$)| and has to generate $\tau_i$. The adversary A should not be able to distinguish between the real and ideal executions. The simulator S works as follows.

Input: Initially, $L_{size}^{adap}$(DB)=N.
The simulator:
Initialization phase:
1. S creates data block Data containing s(N) elements, each chosen uniformly and independently at random.
2. It initializes a set S with N random elements ($\ell_i, \widehat{n_i'}$)
3. It uniformly shuffles S and computes HT←HTSetup(S).
4. S then outputs: EDB=(Data, HT).

Query: With each query that the experiment performs, the simulator receives the leakage |DB($w_i$)|.

5. S chooses a pair ($\ell_i, \widehat{n_i'}$) from S and removes the pair.
6. It computes $k_i$=|DB($w_i$)|$\oplus \widehat{n_i'}$.
7. It uniformly samples $r_i$.
8. S then outputs: $\tau_i = \ell_i, k_i, r_i$).

We now claim that no adversary can distinguish whether (EDB, $\tau=\{\tau_i\}_{w_i \varepsilon w}$) was generated in the real execution or by the simulator. We show this by the following hybrid experiments:

1. Hyb$_0$. This is the real execution, where the adversary A receives EDB as output of EDBSetup, and $\tau_i=(\ell_i, k_i, r_i)$ with ($\ell_i, k_i, r_i, K_i$)=PRF$_K$($w_i$) for every query $w_i$.

2. Hyb$_1$. In this experiment, we run the real world execution, where instead of using PRF$_K$ (where K←KeyGen $(1^\lambda)$) in Step 0 of Construction 4.3, we use a truly random function. Note that as a result, all the keys ($\ell_i, k_i, r_i, K_i$) are uniform (for every $w_i \varepsilon W$). In addition, note that the key K as outputted by KeyGen is redundant.

3. Hyb$_2$. In this experiment, we change the value $\widehat{n_i}$ (in Step 0 of Construction 4.3) to be a uniform value of the appropriate length. Then, when generating a token we compute $k_i = \widehat{n_i} \oplus n_i$, instead of using the key $k_i$ generated by the truly random function. Note that this makes the key $k_i$ generated by the truly random function redundant. Hyb$_3$. Here, for every $w_i \varepsilon W$, we replace the encryption of each element in DB($w_i$) (i.e., Eq. (1) of Construction 4.3) with an independent truly random value of the appropriate length. As a result, all elements of the data block Data are uniform and independent.

4. Hyb$_4$. The last hybrid is the ideal execution. Here we run the simulator S defined above instead of the algorithms EDBSetup and TokGen.

Hyb$_0$ and Hyb$_1$ are computationally indistinguishable from the security assumption of the pseudorandom function PRF. The experiments Hyb$_1$ and Hyb$_2$ are identically distributed since for every $w_i \varepsilon W$, $\widehat{n_i}$ is uniformly distributed in both experiments, and for every query $w_i \varepsilon w$, $k_i$ is determined by $k_i = \widehat{n_i} \oplus n_i$. Hyb$_2$ and Hyb$_3$ are computationally indistinguishable based on the pseudorandom ciphertexts property of the encryption scheme Enc. Finally, Hyb$_3$ and Hyb$_4$ are statistically close, where the only difference is the possibility of failure of the algorithm Allocation, which is negligible in N. This concludes the proof.

Conclusion. By combining Theorem 4.4 with the allocation algorithms OneChoiceAllocation (Algorithm 3.1) and TwoChoiceAllocation (Algorithm 3.4) we obtain the following corollary:

Corollary 4.5 Assuming the existence of one-way functions, there exist searchable symmetric encryption schemes with the following properties: Space O(N), locality O(1), and read efficiency $\tilde{O}$(log N) without any assumptions on the structure of the database.

Space O(N), locality O(1), and read efficiency $\tilde{O}$(log log N) assuming that no keyword appears in more than $$N^{1-\frac{1}{\log\log N}}$$

documents.

The following is a discussion of various extensions of the present generic transformation from allocation algorithms to searchable symmetric encryption schemes (Construction 4.3).

Reducing one round of interaction. When considering the SSE scheme that is based on our one-choice allocation algorithm OneChoiceAllocation, we can in fact reduce one round of interaction (as in Cash and Tessaro 2014). Specifically, we revisit Construction 4.3 and provide some modifications. We then claim that under some additional assumptions on the underlying allocation algorithm (which are satisfied by our one-choice algorithm), the resulting construction is still a secure SSE scheme.

The modifications are as follows. Assume that while the client encrypts the lists, in addition it shuffles the elements in each bin. Then, we just combine the Resolve algorithm into the algorithm Search. That is, we also give the server the secret state $\rho_i$, so that it can perform the Resolve algorithm by itself and will not have to send the additional message to the client. Given the previous algorithms (KeyGen, EDB-Setup, TokGen, Search, Resolve), our new scheme defines EDBSetup algorithm is modified as above (i.e., shuffles each bin), and for $(\tau_i, \rho_i)$=TokGen(K,$w_i$), we define the new search algorithm as Search'($\tau_i$, EDB)=Resolve($\rho_i$,Search($\tau_i$, EDB)). The scheme omits the Resolve algorithm, since the server already obtains the list of identifiers (or, documents). We note that this is secure since the allocation algorithm satisfies the following (strong) property: not only that the possible location of each list is independent of the possible locations of other lists, but rather, the actual location of each list is independent of the structure of the other lists, conditioned that the allocation was successful (no bin was overflowing, which occurs with all but negligible probability). However, the security obtained in this manner is only static in the standard model (or adaptive in the random oracle model)—see Section 5 where we deal with a similar issue and provide a more elaborate discussion.

On the actual leakage of the scheme. The security obtained in Theorem 4.4 is for the modest leakage function $L_{sizes}^{adap}$. However, this holds as long as the client stores a database of keyword-document pairs, and the decryption is done by the client and is not revealed to the server. In case that the database consists of keyword-identifier pairs, then recall that in the second round the client sends the identifiers and receives back the encrypted documents. As a result, although the first round of interaction can be simulated using the $L_{sizes}^{adap}$-leakage function, this leakage is not enough for simulating the second round, and the actual leakage is $L_{min}^{adap}$.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for searchable symmetric encryption, the method comprising using at least one hardware processor for:
    accessing a computerized database that comprises keyword lists, each of the keyword lists comprising memory addresses of electronic documents that all contain a respective keyword;
    binning the memory addresses by performing balanced allocation of the memory addresses into ordered bins, such that at least some of the ordered bins each contains memory addresses of electronic documents that contain different keywords;
    encrypting each of the memory addresses with an encryption key that is derived from the keyword of the respective memory address; and
    storing the ordered bins at consecutive locations in a non-transient computer-readable memory, wherein the consecutive locations preserve the order of the ordered bins.
2. The method according to claim 1, wherein the balanced allocation comprises:
    distributing the memory addresses of each keyword list along consecutive ones of the ordered bins.
3. The method according to claim 2, further comprising, following said binning:
    padding at least some of the ordered bins such that all the ordered bins are of a same size.
4. The method according to claim 3, further comprising, following said padding:
    uniformly shuffling each of the padded ordered bins.
5. The method according to claim 1, further comprising:
    recovering a requested one of the keyword lists by:
        receiving a query, the query comprising a decryption key that corresponds to the encryption key that was derived from the respective keyword of the requested keyword list,
        attempting to decrypt encrypted memory addresses in consecutively-located bins, until reaching one of the bins in which none of the encrypted memory addresses is decryptable; and
    utilizing those of the memory addresses that were successfully decrypted to access the electronic documents stored at those memory addresses.
6. A computer program product for searchable symmetric encryption, the computer program product comprising a non-transitory computer-readable storage medium having program code embodied therewith, the program code executable by at least one hardware processor to:
    access a computerized database that comprises keyword lists, each of the keyword lists comprising memory addresses of electronic documents that all contain a respective keyword;
    bin the memory addresses by performing balanced allocation of the memory addresses into ordered bins, such that at least some of the ordered bins each contains memory addresses of electronic documents that contain different keywords;
    encrypt each of the memory addresses with an encryption key that is derived from the keyword of the respective memory address; and
    store the ordered bins at consecutive locations in a non-transient computer-readable memory, wherein the consecutive locations preserve the order of the ordered bins.
7. The computer program product according to claim 6, wherein the balanced allocation comprises:
    distributing the memory addresses of each keyword list along consecutive ones of the ordered bins.
8. The computer program product according to claim 7, wherein the program code is further executable, following said binning, to:
    pad at least some of the ordered bins such that all the ordered bins are of a same size.
9. The computer program product according to claim 8, wherein the program code is further executable, following said padding, to:
    uniformly shuffling each of the padded ordered bins.
10. The computer program product according to claim 6, wherein the program code is further executable to:
    recover a requested one of the keyword lists by:
        receiving a query, the query comprising a decryption key that corresponds to the encryption key that is derived from the respective keyword of the requested keyword list,
        attempting to decrypt encrypted memory addresses in consecutively-located bins, until reaching one of the bins in which none of the encrypted memory addresses is decryptable; and utilize those of the memory addresses that were successfully decrypted to access the electronic documents stored at those memory addresses.

11. A system comprising:
at least one hardware processor; and
a non-transitory computer-readable storage medium having program code embodied therewith, the program code executable by said at least one hardware processor to:
  access a computerized database that comprises keyword lists, each of the keyword lists comprising memory addresses of electronic documents that all contain a respective keyword;
  bin the memory addresses by performing balanced allocation of the memory addresses into ordered bins, such that at least some of the ordered bins each contains memory addresses of electronic documents that contain different keywords;
  encrypt each of the memory addresses with an encryption key that is derived from the keyword of the respective memory address; and
  store the ordered bins at consecutive locations in a non-transient computer-readable memory, wherein the consecutive locations preserve the order of the ordered bins.

12. The system according to claim 11, wherein the balanced allocation comprises:
  distributing the memory addresses of each keyword list along consecutive ones of the ordered bins.

13. The system according to claim 12, wherein the program code is further executable, following said binning, to:
  pad at least some of the ordered bins such that all the ordered bins are of a same size.

14. The system according to claim 13, wherein the program code is further executable, following said padding, to:
  uniformly shuffling each of the padded ordered bins.

15. The system according to claim 11, wherein the program code is further executable to:
  recover a requested one of the keyword lists by:
    receiving a query, the query comprising a decryption key that corresponds to the encryption key that is derived from the respective keyword of the requested keyword list,
    attempting to decrypt encrypted memory addresses in consecutively-located bins, until reaching one of the bins in which none of the encrypted memory addresses is decryptable; and
    utilize those of the memory addresses that were successfully decrypted to access the electronic documents stored at those memory addresses.

16. The method according to claim 4, further comprising:
  recovering a requested one of the keyword lists by:
    receiving a query, the query comprising a decryption key that corresponds to the encryption key that was derived from the respective keyword of the requested keyword list,
    attempting to decrypt encrypted memory addresses in consecutively-located bins, until reaching one of the bins in which none of the encrypted memory addresses is decryptable; and
  utilizing those of the memory addresses that were successfully decrypted to access the electronic documents stored at those memory addresses.

17. The computer program product according to claim 9, wherein the program code is further executable to:
  recover a requested one of the keyword lists by:
    receiving a query, the query comprising a decryption key that corresponds to the encryption key that was derived from the respective keyword of the requested keyword list,
    attempting to decrypt encrypted memory addresses in consecutively-located bins, until reaching one of the bins in which none of the encrypted memory addresses is decryptable; and
  utilize those of the memory addresses that were successfully decrypted to access the electronic documents stored at those memory addresses.

18. The system according to claim 14, wherein the program code is further executable to:
  recover a requested one of the keyword lists by:
    receiving a query, the query comprising a decryption key that corresponds to the encryption key that was derived from the respective keyword of the requested keyword list,
    attempting to decrypt encrypted memory addresses in consecutively-located bins, until reaching one of the bins in which none of the encrypted memory addresses is decryptable; and
  utilize those of the memory addresses that were successfully decrypted to access the electronic documents stored at those memory addresses.

* * * * *